United States Patent [19]
Chiang et al.

[11] Patent Number: 6,111,816
[45] Date of Patent: *Aug. 29, 2000

[54] MULTI-DIMENSIONAL BEAMFORMING DEVICE

[75] Inventors: Alice M. Chiang, Weston, Mass.; Jeffrey M. Gilbert, El Cerrito, Calif.; Steven R. Broadstone, Woburn, Mass.

[73] Assignee: TeraTech Corporation, Burlingon, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/965,663

[22] Filed: Nov. 6, 1997

Related U.S. Application Data
[60] Provisional application No. 60/036,837, Feb. 3, 1997.

[51] Int. Cl.$^7$ .................................................. G03B 42/06
[52] U.S. Cl. ............................................. 367/7; 367/138
[58] Field of Search .................................... 367/7, 11, 88, 367/138, 119, 103; 600/447

[56] References Cited

U.S. PATENT DOCUMENTS

| | | | |
|---|---|---|---|
| 4,034,483 | 7/1977 | Bernstein et al. | 35/10.4 |
| 4,152,678 | 5/1979 | Shott et al. | 333/150 |
| 4,159,462 | 6/1979 | Rocha et al. | |
| 4,227,417 | 10/1980 | Glenn | 73/625 |
| 4,233,678 | 11/1980 | Brady, III | 367/122 |
| 4,241,608 | 12/1980 | Dees et al. | 73/606 |
| 4,244,037 | 1/1981 | Jelks | 367/121 |
| 4,245,333 | 1/1981 | Jelks | 367/121 |
| 4,253,168 | 2/1981 | Petrosky et al. | 367/123 |
| 4,254,662 | 3/1981 | Kuroda et al. | 73/626 |
| 4,267,584 | 5/1981 | McKeighen et al. | 367/11 |
| 4,274,148 | 6/1981 | Hullenaar | 367/122 |
| 4,277,787 | 7/1981 | King. | |
| 4,307,613 | 12/1981 | Fox | 73/626 |
| 4,313,184 | 12/1982 | Jarman et al. | 367/88 |
| 4,336,607 | 6/1982 | Hill et al. | 367/123 |
| 4,401,957 | 8/1983 | McKeighen et al. | 333/165 |
| 4,464,726 | 8/1984 | Chiang. | |
| 4,544,927 | 10/1985 | Kurth et al. | |
| 4,616,231 | 10/1986 | Autrey et al. | 342/374 |
| 4,947,176 | 8/1990 | Inatsune et al. | 342/173 |
| 5,014,250 | 5/1991 | Hadderingh | 367/124 |
| 5,029,144 | 7/1991 | Griffin | 367/11 |
| 5,030,953 | 7/1991 | Chiang | 341/172 |
| 5,031,625 | 7/1991 | Higashiizumi et al. | |
| 5,089,983 | 2/1992 | Chiang. | |
| 5,126,962 | 6/1992 | Chiang. | |
| 5,200,755 | 4/1993 | Matsuda et al. | 342/158 |
| 5,228,007 | 7/1993 | Murakami et al. | 367/103 |
| 5,276,452 | 1/1994 | Schuss et al. | 342/371 |
| 5,343,211 | 8/1994 | Kott | 342/379 |

(List continued on next page.)

FOREIGN PATENT DOCUMENTS

| | | |
|---|---|---|
| 0 593 822 A1 | 10/1992 | European Pat. Off. . |
| 2 130 798 | 10/1982 | United Kingdom . |

OTHER PUBLICATIONS

Takeuchi, Y., "Coded Excitation for Harmonics Imaging," IEEE ULTRASONICS SYMPOSIUM, 1433–1437 (1996).

(List continued on next page.)

*Primary Examiner*—Daniel T. Pihulic
*Attorney, Agent, or Firm*—Hamilton, Brook, Smith & Reynolds, P.C.

[57] ABSTRACT

A multi-dimensional beamforming device that performs consecutive one-dimensional operations. For example, beamsteering for a two-dimensional array can be include a projection of a beam onto each of the respective axes of the array. In such a device, a first beamforming processing element is used to form multiple beams for each array output along a given row. In a preferred embodiment, sequential output vectors from the first processing element are then applied to a transposing or corner turning memory and the data are reformatted such that all elements on a given column of the array are applied to a second beam forming processing element.

25 Claims, 16 Drawing Sheets

U.S. PATENT DOCUMENTS

| | | |
|---|---|---|
| 5,386,830 | 2/1995 | Powers et al. . |
| 5,517,537 | 5/1996 | Greene et al. .............................. 376/252 |
| 5,533,383 | 7/1996 | Green et al ............................... 73/40.5 |
| 5,535,150 | 7/1996 | Chiang . |
| 5,555,200 | 9/1996 | Chiang . |
| 5,555,534 | 10/1996 | Maslak et al. ............................ 367/175 |
| 5,590,658 | 1/1997 | Chiang et al. . |
| 5,623,930 | 4/1997 | Wright et al. . |
| 5,685,308 | 11/1997 | Wright et al. . |
| 5,904,652 | 5/1999 | Gilbert et al. ............................ 600/447 |

OTHER PUBLICATIONS

Tanaka, T., et al., "Digital Signal Processor for Digital Multi Beam Forming Antenna in Mobile Communications," ATR Optical and Radio COmmunications Research Laboratories, 1507–1511 (Aug. 6, 1994).

Beetner, D. G., and Arthur, M. R., "Generation of Synthetic–Focus Images from Pulse–Echo Ultrasound Using Difference Equations," IEEE, 665–672 (Oct. 1996).

Broadstone, S. R., and Arthur, M. R., "Determination of Time–of–Flight Surfaces Using the Method fo Moments" IEEE, 173–179 (Jun. 1991).

Shott, J.D., et al., "Charge–coupled devices for use in electronically–focused ultrasonic imaging systems" 8409 Proceedings of the I.E.E.–F, vol. 127 (1980) Apr., N°2, Stevenage.

Macovshi, Albert, "Ultrasonic Imaging Using Arrays" Proceedings of the IEEE, vol. 67, No. 4, Apr. 1979.

Brady, J.J., "A Serial phase shift beamformer using charge transfer devices" 8014 Journal of acoustical Sty of America, vol. 68 (1980) Aug., N°2, New York, NY.

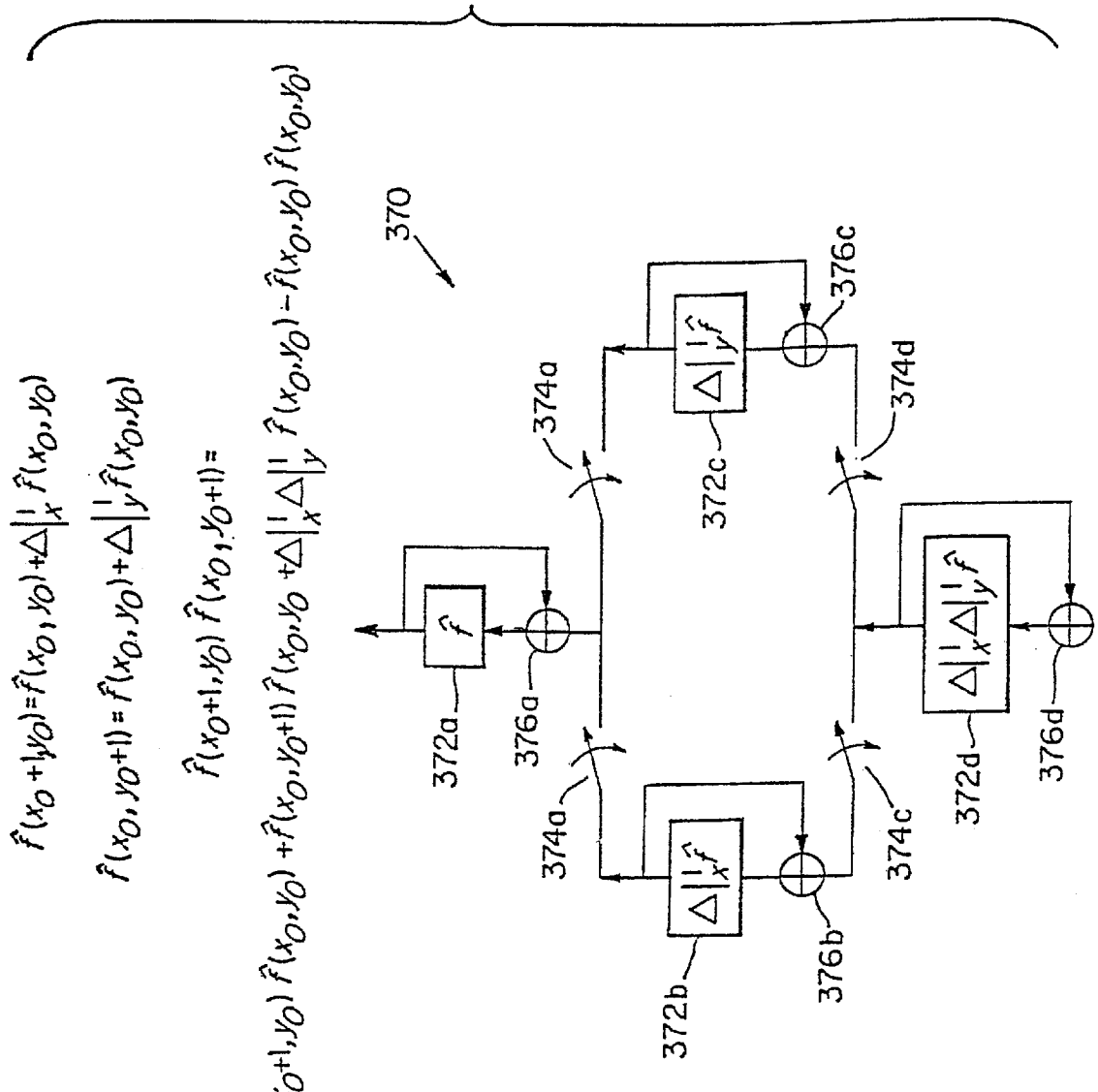

MULTI-DIMENSIONAL BEAMFORMING DEVICE

RELATED APPLICATION

This application claims the benefit of U.S. Provisional Patent Application No. 60/036,837, filed on Feb. 3, 1997, the entire contents of which is incorporated herein by reference.

FIELD OF THE INVENTION

This invention relates generally to beamforming and beamsteering systems, and in particular to a processing technique used in such systems to provide for forming or steering of multiple beams from a multi-dimensional sensor array.

BACKGROUND OF THE INVENTION

One use of sensor arrays is to isolate signal components that are traveling from, or propagating to, a particular direction. They find use in a number of different applications. For example, sonar systems make use of sensor arrays to process underwater acoustic signals to determine the location of a noise source; arrays are also used in radar systems to produce precisely shaped radar beams. Array processing techniques for isolating received signals are known as beamforming, and when the same or analogous principles are applied to focus the transmission of signals, the techniques are referred to as beamsteering.

Considering the process of beamforming in particular, it is typically necessary to use a fairly large number of signal processing components to form the desired directional beams. The signal from each sensor is typically divided into representative components by subjecting each signal to multiple phase shift, or time delay, operations which cancel the equivalent time delay associated with the respective relative position of the sensor in the array. To form the directional beam the time shifted signals from each sensor are then added together. The imparted time delays are chosen such that the signals arriving from a desired angular direction add coherently, whereas those signals arriving from other directions do not add coherently, and so they tend to cancel. To control the resulting beamwidth and sidelobe suppression, it is typical for each time delayed signal to be multiplied or "amplitude shaded" by a weighting factor which depends upon the relative position of the sensor in the array.

Beamforming in one dimension can thus be realized through a relatively straight-forward implementation using a linear array of sensors and a beamforming processor, or beamformer, that delays each sensor output by the appropriate amount, weights each sensor output by multiplying by the desired weighting factor, and then sums the outputs of the multiplying operation. One way to implement such a beamformer is to use a tapped delay line connected to each array element so that the desired delay for any direction can be easily obtained by selecting the proper output tap. The beam steering operation then simply consists of specifying the appropriate tap connections and weights to be applied.

However, a beamforming processor becomes much more complex when a two dimensional sensor array is used. Not only does the number of time delay operations increase as the square of the size of the array, but also the physical structures required to connect each sensor to its corresponding delay becomes complex. At the same time, each delay unit must be provided with multiple taps for the formation of multiple beams. The problem can become prohibitively complicated when the simultaneous formation of multiple beams is required.

As to implementation choices, beamforming technology was originally developed for detection of acoustic signals in sonar applications. The beamformers built for these early sonars used analog delay lines and analog signal processing components to implement the sum and delay elements. Networks of resistors were then used to weight and sum the appropriately delayed signals. However, the number of beams that can be implemented easily with such techniques is limited since each beam requires many discrete delay lines, or delay lines with many taps and many different weighting networks. As a result, it became common to share a delay line by using scanning switches to sequentially look in all directions. However, with this approach only one beam is available at a given time.

Recent advancements in integrated circuit electronics has provided the capability to implement practical digital beamforming systems. In these systems a signal from each sensor is first subjected to analog to digital conversion prior to beamforming. The beamformers are implemented using digital shift registers to implement the delay and digital multiplier components to implement the required weighting. The shift registers and multiplier components are typically controlled by command signals that are generated in general purpose computers using algorithms or equations that compute the values of the delays and phase weightings necessary to achieve the desired array beam position. Beam control thus requires fairly complex data processors and/or signal processors to compute and supply proper commands; this is especially the case if more than one beam is to be formed simultaneously.

For these reasons, few multi-dimensional multiple beam systems exist that can operate in real time with a minimum implementation complexity.

SUMMARY OF THE INVENTION

The invention is a beamsteering or beamforming device (generically, a beamforming device), that carries out multi-dimensional beamforming operations as consecutive one-dimensional operations. In a preferred embodiment the two operations are interposed by a transpose operation. For example, beamforming for a two-dimensional array of sensors is carried out as a set of projections of each desired output beam onto each of the two respective axes of the array.

Signal samples are periodically taken from each sensor in the array and then operated on as a group, or matrix, of samples. A first one-dimensional (1D) beamformer is used to form multiple beams for each sensor output from a given row of the sample matrix. The multiple output beams from the first 1D beamformer are then applied to a transposing operation which reformats the sample matrix such that samples originating from a given column of the sensor array are applied as a group to second one-dimensional (1D) beamformer.

The beamformer can be implemented in an architecture which either operates on the samples of the sensor outputs in a series of row and column operations, or by operating on the sample matrix in parallel. In the serial implementation, a group of multiplexers are used at the input of the first 1D beamformer. Each multiplexer sequentially samples the outputs of the sensors located in a given column of the array. The multiplexers operate in time synchronization such that at any given time, the outputs from the group of multiplexers provide samples from the sensors located in each row of the array.

The multiplexers then feed the first 1D beamformer that calculates the projection of each row onto a first array axis, for each of the desired angles. In the serial implementation, the first 1D beamformer is implemented as a set of tapped delay lines formed from a series of charge coupled devices (CCDs). Each delay line receives a respective one of the multiplexer outputs. A number of fixed weight multipliers are connected to predetermined tap locations in each delay line, with the tap locations determined by the set of desired angles with respect to the first array axis, and the weights depending upon the desired beam width and sidelobe supression. Each output of the first 1D beamformer is provided by adding one of the multiplier outputs from each of the delay lines.

The serial implementation of the transposer uses a set of tapped delay lines with one delay line for each output of the first 1D beamformer. The tapped delay lines have a progressively larger number of delay stages. To provide the required transpose operation, samples are fed into the delay lines in the same order in which they are received from the first 1D beamformer; however, the samples are read out of the delay lines in a different order. Specifically, at a given time, the output of the beamformer are all taken from a specific set of the last stages of one of the delay lines.

Finally, the second 1D beamformer consists of a set of tapped delay lines, fixed weight multipliers and arranged in the same manner as the first 1D beamformer. However, the weights and delays applied by the second 1D beamformer are determined by the set of desired angles to be formed with respect to a second axis of the array.

In a parallel implementation of the invention, the multiplexers are not used, and instead the outputs of the array are fed directly to a set of parallel processing elements which operate on samples taken from all of the sensors simultaneously. Each processing element produces a set of beamformed outputs that correspond to the samples taken from one of the rows of sensors beamformed at each of the desired angles with respect to the first array axis. In this parallel implementation, the transposing operation is carried out by simply routing the outputs of the processing elements in the first 1D beamformer to the appropriate inputs of the second 1D beamformer. The second 1D beamformer likewise is implemented as a set of parallel processing elements, each processing element operating on beamformed samples corresponding to those taken from one of the columns of the array, beamformed at each of the desired angles with respect to the second array axis.

In another preferred embodiment of the invention, a low power time domain delay and sum beamforming processor involves programmable delay circuits in sequence to provide a conformal acoustic lens. This electronically adjustable acoustic conformed lens has a plurality of subarrays that can be separately controlled to adjust viewing angle and their outputs coherently summed for imaging.

The invention provides a substantial advantage over prior art beamformers. For example, a device capable of steering up to one hundred beams for a ten by ten sonar array can be implemented on a single integrated circuit chip operating at a relatively low clock rate of 3.5 MegaHertz (MHZ), representing a continuous equivalent throughput rate of approximately 14 billion multiply-accumulate operations per second.

BRIEF DESCRIPTION OF THE DRAWINGS

This invention is pointed out with particularity in the appended claims. The above and further advantages of the invention may be better understood by referring to the following description in conjunction with the accompanying drawings, in which:

FIG. 16 illustrates a method for computing delay requirements in parallel to afford real time processing in accordance with the invention.

DETAILED DESCRIPTION OF PREFERRED EMBODIMENTS

Figure 1:
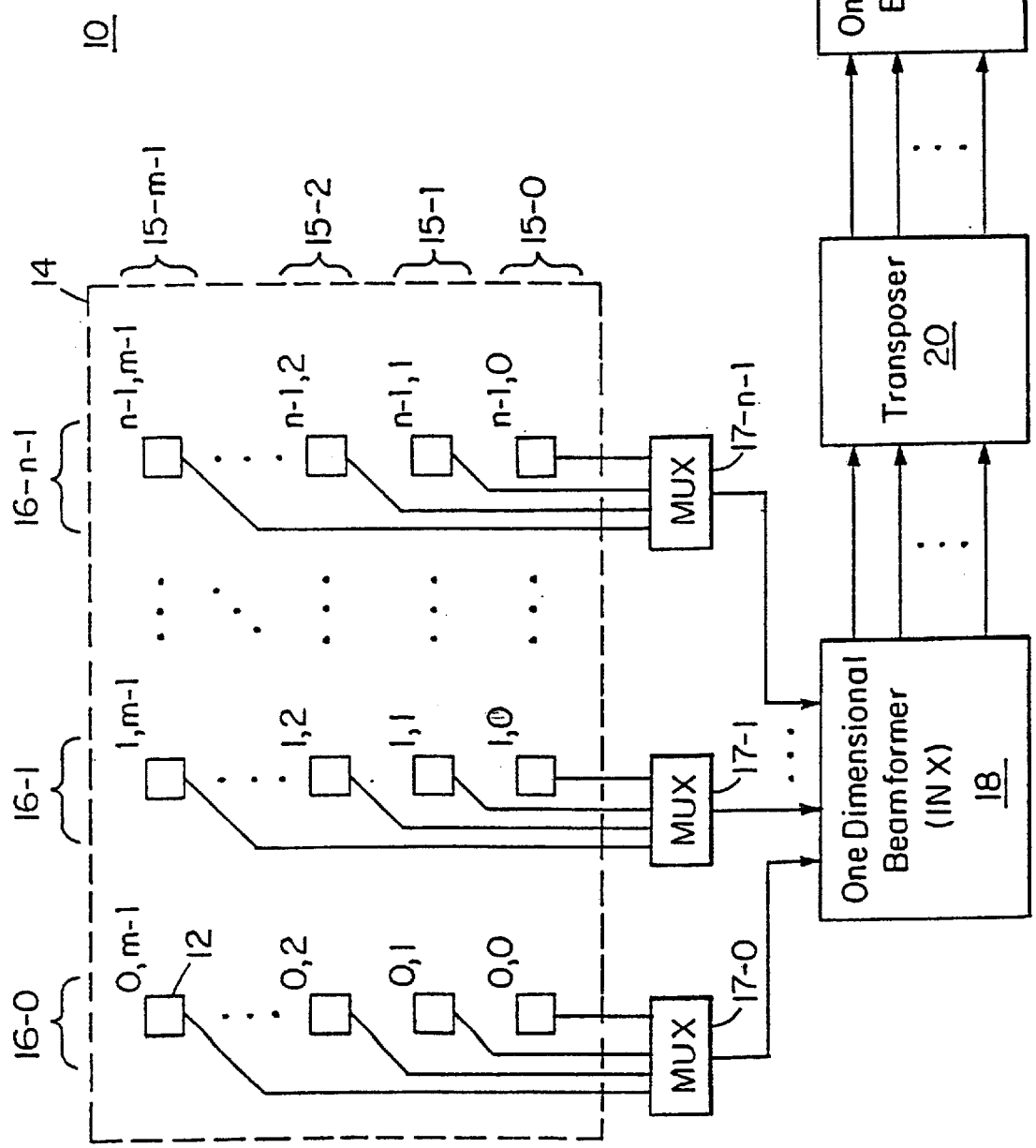
FIG. 1 is a block diagram of a serial implementation of a multiple simultaneous beamformer according to the invention.

Turning attention now to the drawings, FIG. 1 illustrates a system 10 for use with a two-dimensional, planar sensor array according to the serial implementation of the invention. The system 10 shown in FIG. 1 is a beamforming system, that is, system 10 operates with sensors 12 that detect received signals. However, as will be understood from the following description, the invention also applies to beamsteering systems where the sensors 12 are transmitting signals, and the signal directions are reversed.

The beamforming system 10 consists of a number of sensors 12 arranged in a planar array 14, a number, n, of multiplexers 17-0, 17-1 ... 17-(n−1), a first one-dimensional (1D) beamformer 18, a transposer 20, and a second 1D beamformer 22.

The array 14 consists of a number of sensors 12 arranged in an array of m rows 15-0, 15-1, 15-(m−1), each row having n sensors 12, and n columns 16-0, 16-1, 16-(n−1) having m sensors 12. The array may or may not be square, that is, n may or may not be equal to m.

The exact type of sensor 12 depends upon the particular use of the system 10. For example, in a system 10 intended for application to sonar, each sensor 12 is a hydrophone. In an application to radar systems, each sensor 12 is an antenna.

Figure 2:
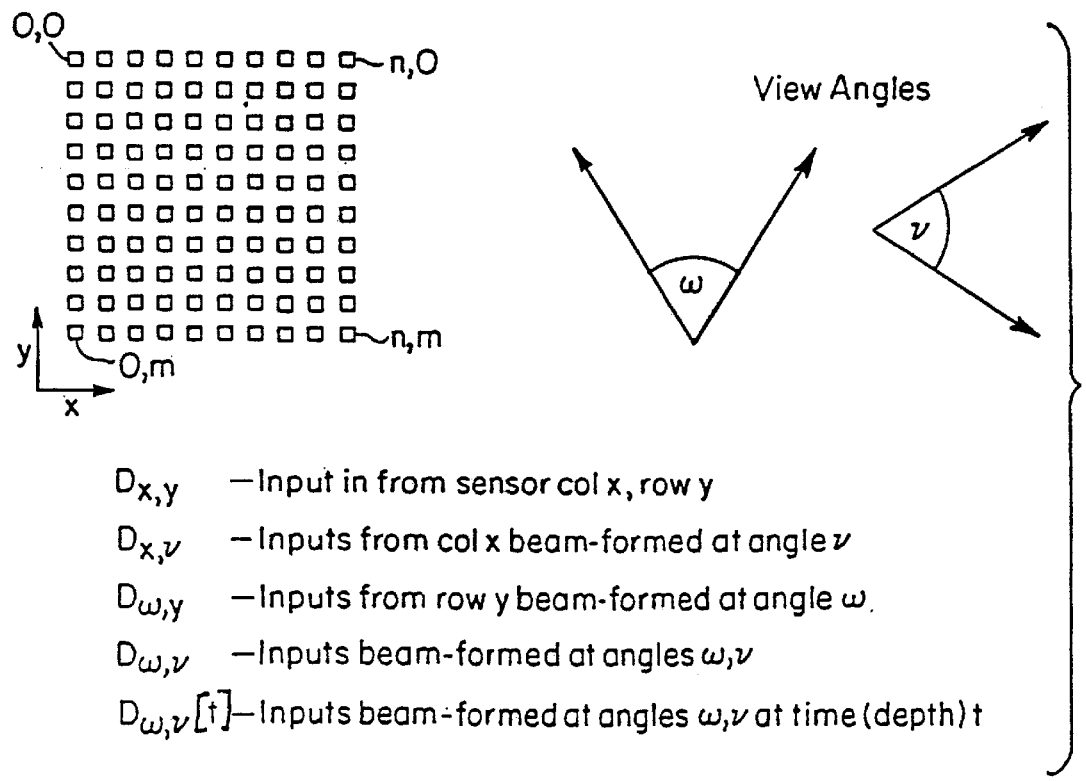
FIG. 2 illustrates the notation used herein to refer to various elements in the sensor array and their beam transformations.

The remainder of the components of the system 10 operate to form multiple output beams 24 simultaneously. Before proceeding with a detailed description of the structure and operation of the system 10, it is helpful to define a notation to refer to the various sensors 12 and as shown in FIG. 2. In particular, each of the (n×m) sensors 12 in the array 14 are referred to herein with respect to its relative horizontal and vertical position (x,y). Thus, for example, the notation Dx,y represents the signal provided by the sensor 12 located at column number x, row number y.

The notation Dx,v is used to refer to a beam formed using all of the sensors located in a given column, x, at an particular angle, v, with respect to the array 14. Dw,y indicates a beam formed at a particular angle, w, using the sensors 12 in a given row y at an angle w with respect to the array. The notation Dw,v denotes the beam formed at a two dimensional angle (w,v) with respect to the array 14. Dw,v[t] indicates a beam formed at angles (w,v) at a time, t, or a depth, t, from the (x,y) plane of the array 14.

Figure 3:
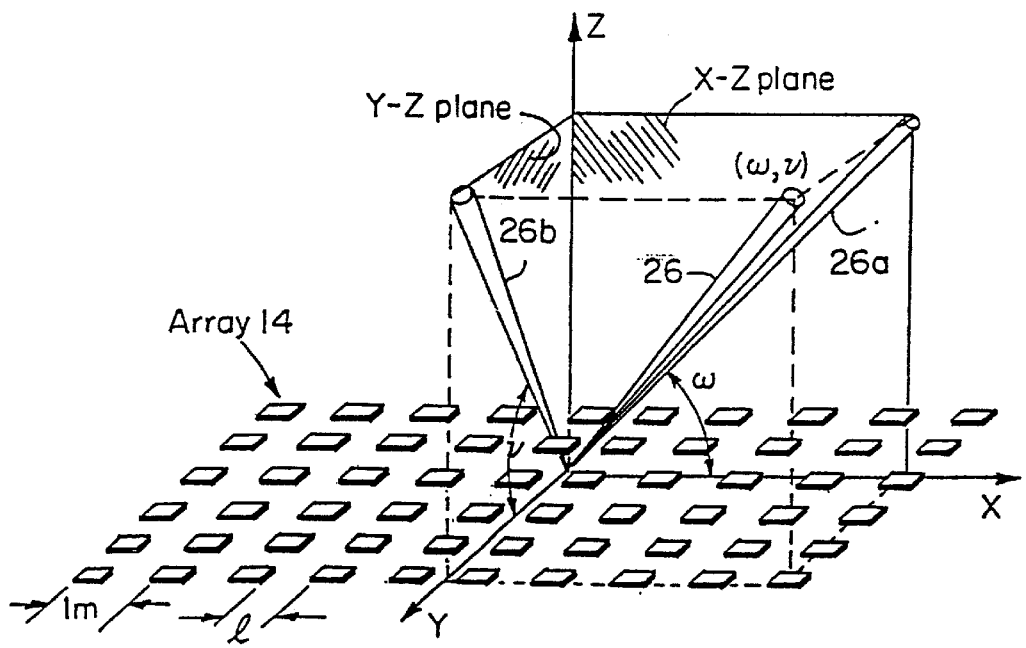
FIG. 3 is a three dimensional view of the array illustrating a beam formed therefrom together with projections of the beam onto a pair of orthogonal array axes.

With reference now to FIG. 3, the operation of the invention may be better understood. In particular, FIG. 3 illustrates the planar array 14 in a three-dimensional view and an exemplary beam 26 formed on an angle (w,v) with respect to the (x,y) plane in which the array 14 is located. An additional third axis, z, is shown and is defined as being orthogonal to the (x,y) plane.

As can be seen from the illustration, the beam 26 formed at the angle (w,v) can be considered as having a pair of components projected upon two planes formed by the z axis and each of the array axes x and y. In particular, the beam 26 has a first component 26-1 in the xz plane forming an angle w with respect to the x axis, as well as a second component 26-2 in the yz plane forming an angle v with respect to the y axis.

This assumption that the beam 26 can be represented as a pair of components 26-1 and 26-2 projected onto the orthogonal planes xz and yz is based upon an assumption that a far field operation approximation is valid for processing signals received from the array 14. The far field approximation will be valid for an array 14 in most sonar applications, for example. In such applications, the sensors 12 may typically be spaced approximately one meter apart, with the sound source being located at a distance of 100 meters or farther away from the array 14. Therefore, the far field approximation assumption is valid in applications where the sensor spacing, l, is much smaller than the distance from the source being sensed. A difference of at least two orders of magnitude between the array sensor spacing and the distance to the source is sufficient for the approximation to be valid.

The operations required to form a number of desired beams 26 at a number of angles (w,v) can thus be decomposed into a pair of successive one-dimensional operation on the sensor outputs. Beam steering in a given direction (w,v) is accomplished as the projection of the beam 26 onto the xz plane forming an angle w with the x axis, followed by a projection onto the yz plane forming an angle v with respect to the y axis.

Returning now to FIG. 1, it can be seen that the first one-dimensional (1D) beamformer 18 thus performs the projection of the beam onto the xz plane, and that the projection onto the yz plane is performed by the subsequent operations of the second 1D beamformer 22. The first 1D beamformer 18 forms a set of beams for each desired beam angle v by taking samples of the signals output from the sensors 12 located in a given 15 row of the array 14. The outputs from the first one-dimensional beamformer 18 are reordered by the transposer 20, to arrange the beamformed outputs derived from a given column 16 together. This permits the second 1D beamformer 22 to perform the required operations at each of the angles w, while at the same time permitting the second 1D beamformer 22 to have the same internal structure as the first 1D beamformer 18.

Figure 4:
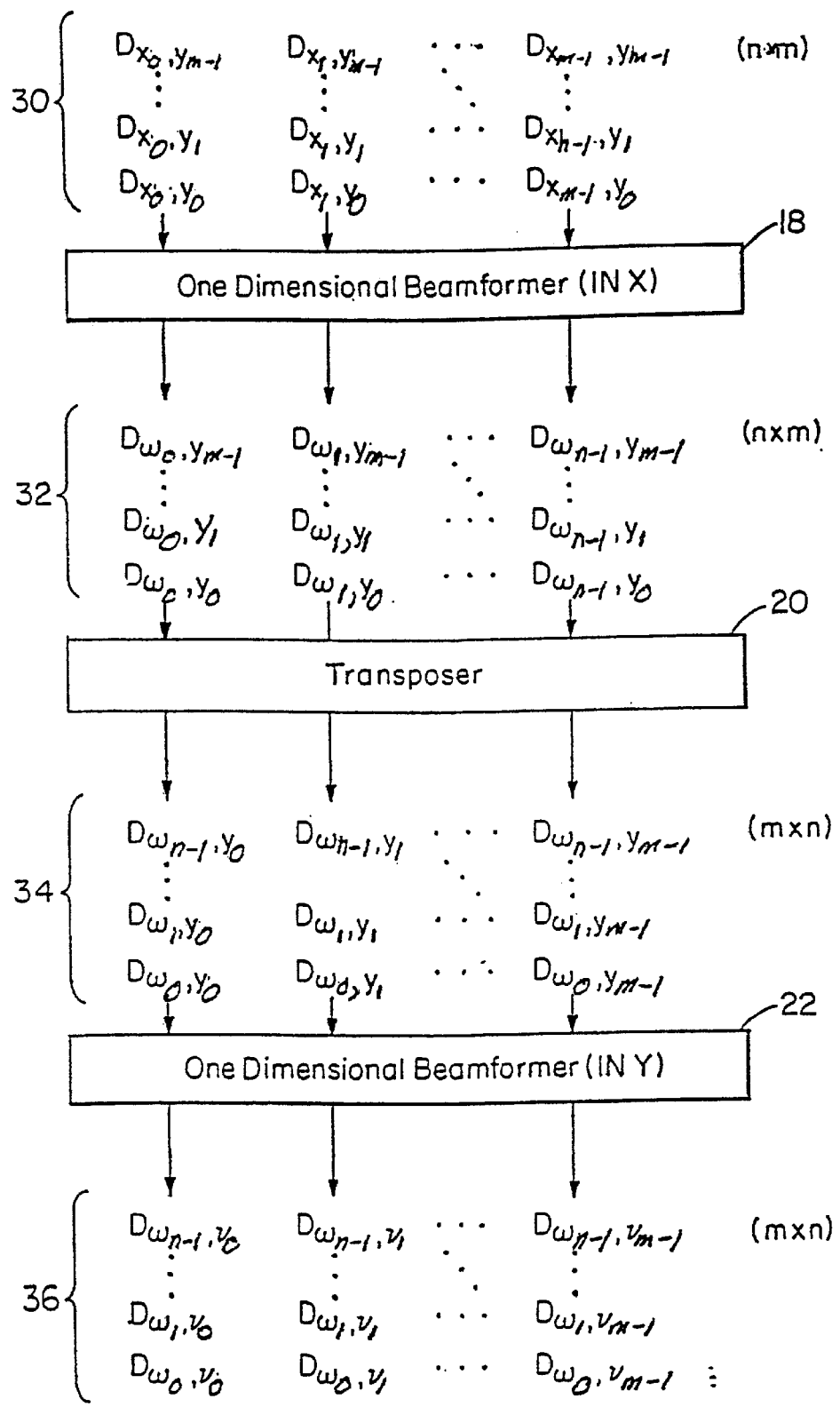
FIG. 4 is a more detailed block diagram of the invention showing a first one-dimensional beamformer, a transposer, and a second one-dimensional beamformer together with various matrices of sensor samples formed by these components.

FIG. 4 is a more detailed view of the operation of the first 1D beamformer 18, the transposer 20, and second 1D beamformer 22. It is assumed that the number of beams to be formed is equal to the number of sensors 12, such that a two dimensional array of beams 26 at each angle $$(wi, vj) \text{ for } I=0 \text{ to } n-1$$

$$\text{and for } j=0 \text{ to } m-1$$

is to be formed. However, it should be understood that the beams need not be the same dimension as the array, and indeed, the total number of beams 26 need not be the same as the total number of sensors 12.

The FIG. 4 shows the inputs from the sensors 12 arranged as sample matrices. In particular, the samples input to the first 1D beamformer 18, $$(Di,j) \text{ for } I=0 \text{ to } n-1$$

$$\text{and for } j=0 \text{ to } m-1$$

are signal samples taken from the sensors located at each respective column and row position. The samples are operated on in two-dimensional groups, or matrices, by the system 10; the set of samples taken from the array 14 is referred to as the matrix 30.

The first 1D beamformer 18 performs a beam forming operation along the x direction at each of the desired beam angles w0, w1, ... , w(n−1). For example, the output Dw0,y0 represents the result of beamforming at a beam angle w0 the samples having a row coordinate of zero. That is, the output Dw0, y0, indicates the result of the beamforming operation on samples D0,0; D0,1; ... , D0,(n−1) located in row 15-0 at one of the desired beam angles w0. Likewise, Dw1,y0 corresponds to the output of the 1D beamformer 18 at beam angle w1, and so on.

The first beamformed matrix 32 output by the first 1D beamformer 18 thus represent input samples Dx,y beamformed along the x axis with each of the respective desired beam angles w0, w1, ... , w(n−1).

The transposer 20 transposes the rows and columns of the first beamformed matrix 32 to produce a transposed matrix 34. The transposed matrix 34 arranges the beamformed samples having the same corresponding y value located in a given column, and the beamformed samples having the same beam angle, w, located in a given row. This permits the second 1D beamformer to perform the 1D beamform operation on the samples in each row, with different angles vj, for j=0 to (m−1).

As a result, the output matrix 36 from the second 1D beamformer 22 represents the two-dimensional beamformed outputs 24, with the output Dw0,v0 representing the beam at angle (w0,v0), the output Dw0,v1 corresponding to the beam at angle (w0,v1), and so on. In other words, the sample outputs from the second 1D beamformer 22 correspond to all two dimensional beams formed the desired angles (wi,vj) for I=0 to n−1, and for j=0 to m−1.

Although FIG. 4 illustrates 1D beamformer 18 translating along the x axis before 1D beamformer 22 translates along the y axis, it should be understood that the order of the 1D beamforming operations can be interchanged.

For the serial pipelined implementation of the invention, the matrices in FIG. 4 can also be interpreted as showing the time sequence in which the samples are operated upon by the first 1D beamformer 18, transposer 20, and second 1D beamformer 22. For example, in FIG. 4, each column in the matrix 30 represents samples taken from a particular one of the n multiplexers 17 in FIG. 1. Therefore, the multiplexers 17 in FIG. 1 sequentially select the output of one of the elements in a given column 13. For example, the first multiplexer 17-0 sequentially samples the outputs of the sensors 12 located in the first column 16-0 of the array 14. Likewise, a second multiplexer 17-1 sequentially samples the output of the sensors 12 located in a second column 16-1 of the array 14. The multiplexers operate sequentially such that each sensor 12 is effectively sampled at a sampling rate of fs.

The leftmost column of the matrix 30 indicates the order of the outputs taken from the first multiplexer 17-0 of FIG. 1. The time sequence begins at the bottom row of the matrix 30 and works up the columns. Therefore, the samples are output by multiplexer 17-0 in a sequence Dx0,y0; Dx0,y1; . . . ; Dx0,ym−1. Since the multiplexers 17 operate in parallel and in row synchronization, the samples taken from the sensors 12 located on the first row, 15-0, that is, samples Dx0,y0; Dx1,y0; Dx2,y0; . . . , Dx(n−1),y0 are applied at the same time to the first 1D beamformer 18. Next, the samples from the second row 15-1, or samples Dx0,y1; Dx1,y1; . . . , Dx(n−1),y1 are applied to the first 1D beamformer 18, and so on.

Since the first 1D beamformer 18 performs a 1D beamforming operation on the samples in a given row 15, the first 1D beamformer can be implemented as a pipelined device such that a new row of samples can be immediately applied to the device and the operation repeated.

Figure 5:
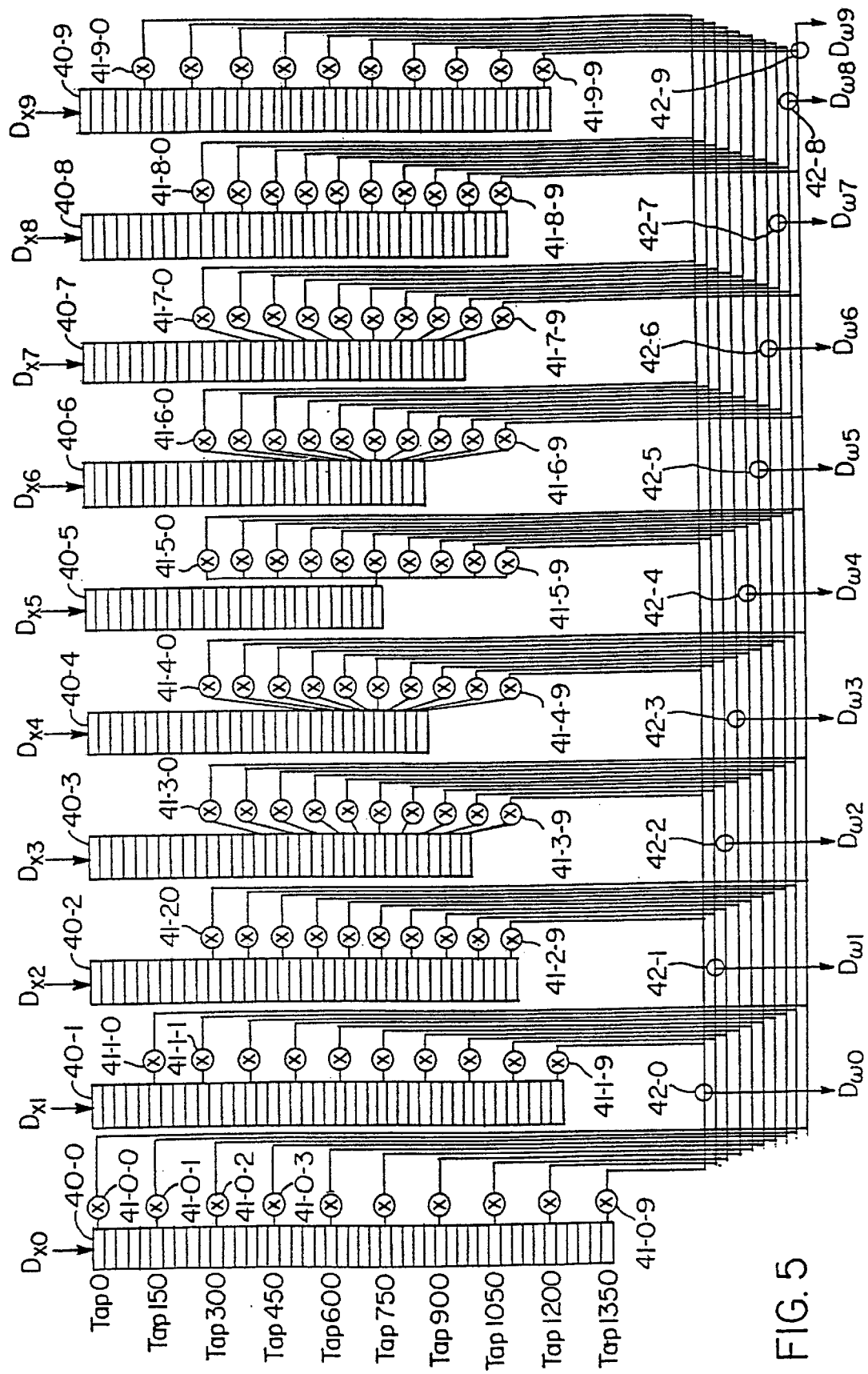
FIG. 5 is a block diagram of a serial implementation of a one-dimensional beamformer.

FIG. 5 is a more detailed view of the serial pipelined implementation of the first beamformer 18 for a 10 by 10 sensor array 14. The illustrated 1D beamformer 18 consists of ten tapped delay lines 40-0, 40-1, . . . 40-9, with a tapped delay line 40 being connected to the output from a corresponding one of the multiplexers 17-0, 17-1, . . . , 17-9. A first group of multipliers 41-0-0, 41-0-1, . . . , 41-0-9 are associated with the first tapped delay line 40-0, a second group of multipliers 41-1-0, 41-1-1, . . . 41-1-9 are associated with the second tapped delay line 40-1, and so on. The notation Dx0 above the first tapped delay line 40-0 indicated that the "x0" samples, that is, samples Dx0,y0; Dx0,y1; . . . ; Dx0,y9 are applied to the input of tapped delay line 40-0 in a repeating sequence.

The tapped delay lines 40 insert appropriate delays in the sensor outputs to account for relative propagation delays of a signal from a particular location. The delay lines 40 are each tapped such that the outputs from a certain number of delay stages are provided to the input of a multiplier 41.

The internal clock rate of each delay line 40 is ten times the input sample rate, fs, to permit the sampling of ten sensors into each tapped delay line 40. The total number of stages in each delay line 40 is sufficient to provide the maximum delay associated with forming a beam at the maximum required one of the angles, w. In the illustrated implementation, the total length of the delay line 40-0 shown is approximately 1350 stages, with ten tap positions set to provide 10 equally spaced apart angles, w.

The position of the taps, that is the exact positions at which the inputs to the respective multipliers 41 is taken, depends upon the desired number of beams. The desired beam shape is defined by the weights applied to the multipliers 41.

Thus for an array 14 forming ten beams from each row 15 of input samples, the first 1D beamformer 18 consists of ten tapped delay lines, each delay line having ten taps and ten multipliers 41.

If the number and position of the desired beams is known in advance, the tap positions and constant values input as weights to the multipliers 41 can be hard wired or mask programmable.

The tapped delay lines 40 are preferably implemented as charge coupled device (CCD) type delay lines with fixed weight multipliers. A preferred implementation of this invention uses a non-destructive sensing type of charge domain device described in a co-pending U.S. patent application Ser. No. 08/580,427, filed Dec. 27, 1995 now U.S. Pat. No. 5,736,757 issued to, Susanne A. Paul entitled "Charge Domain Generation and Replication Devices" the entire contents of which is hereby incorporated by reference.

The outputs of the multipliers 41 are then summed to accomplish the desired multiple simultaneous beam forming functions. The weighted outputs from the multipliers 40 are then simultaneously summed to form the desired beam output along a given row. For example, the output Dw0 is taken by summing the outputs of the last multipliers 41-0-9, 41-1-9, . . . , 41-9-9 associated with each of the tapped delay lines 40.

Figure 6:
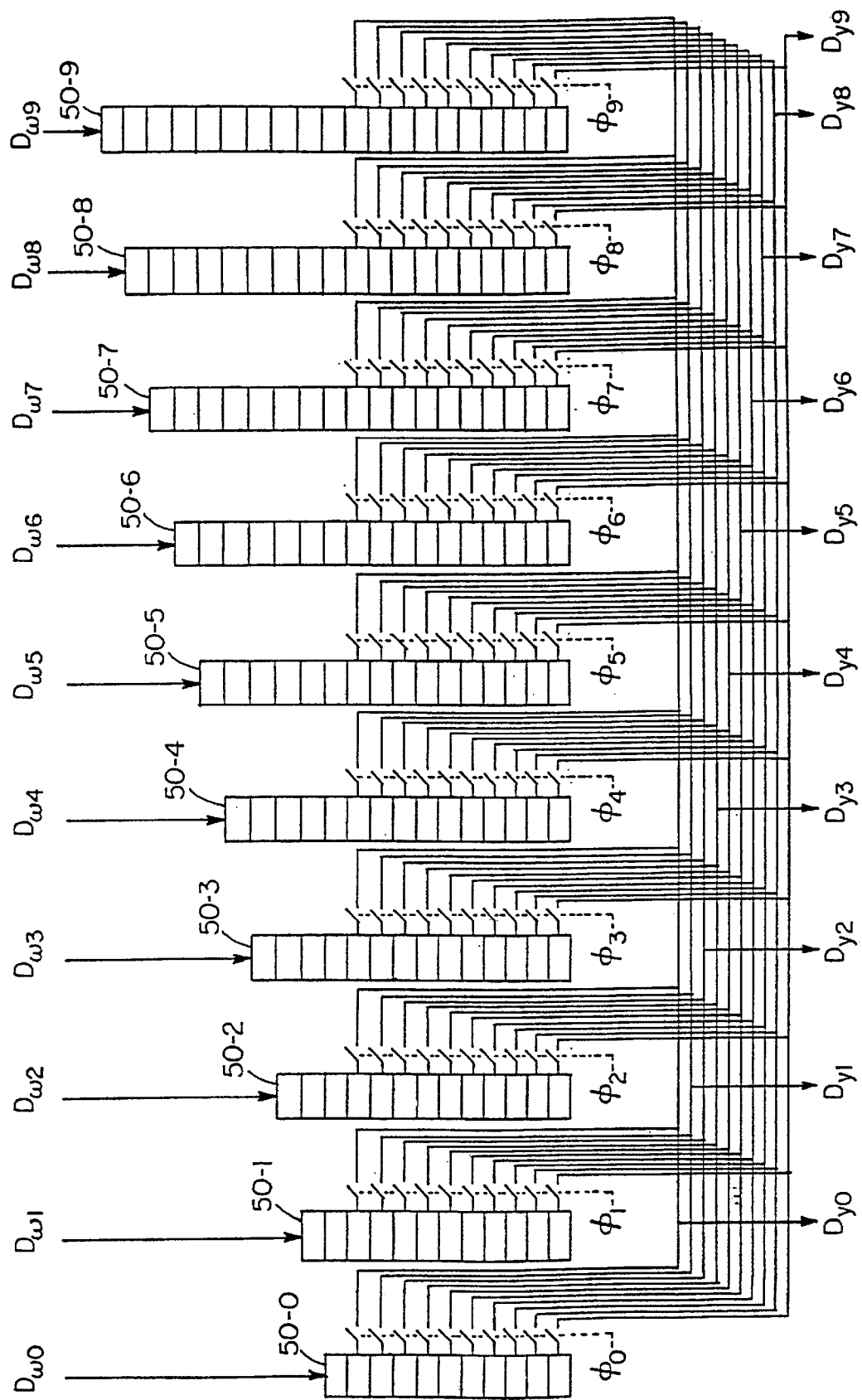
FIG. 6 is a block diagram of a serial implementation of the transposer.

FIG. 6 shows a detailed block diagram of pipelined serial implementation of the transposer 20. In the implementation for a 10 by 10 array, the transposer 20 contains ten parallel inputs which after ten consecutive output sample time periods produces a transposed 10 by 10 transposed matrix 34 according to FIG. 4. In this implementation for serial operation each of the 10 inputs Dx0, Dx1, . . . Dx9 are fed to a simple tapped delay line 50-0, 50-1, 50-2 . . . 50-9. The tapped delay lines 50 operate at the same clock rate, fs, as the input sampling rate.

The number of delay stages within each of the delay lines 50 progressively increases as the column index. For example, the first tapped delay line 50-0 has a length which is one more than the number of rows, m, in the matrix, or 11 stages, the second delay line 50-1 is 12 stages long and so on until the 10th delay line 50-9 is 20 stages long. Only the last 10 stages of each delay line 50 are tapped to provide for outputs.

In operation, the taps associated with each delay line are enabled at the same time in a time slot associated with that delay line. For example, at a first time p0 all of the taps from the first delay line 50-0 are enabled in parallel to provide the ten output Dw0,y0; Dw0,y1; . . . , Dw0,y9. At a second time p1, only the tap from the second delay line 50-1 is enabled. The operation continues until a time p9 at which the taps on the last delay line 50-9 are enabled.

Figure 7:
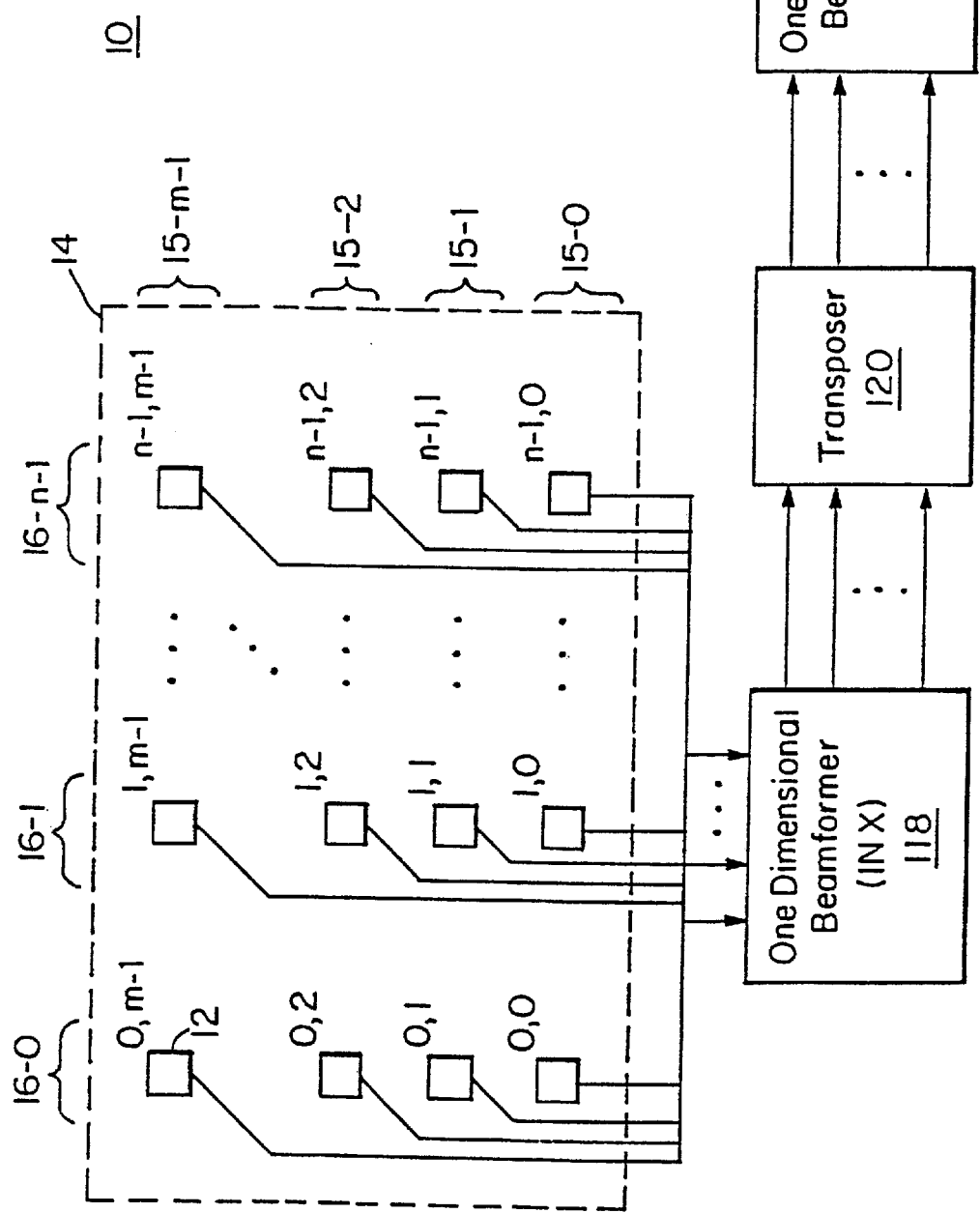
FIG. 7 is a block diagram similar to that of FIG. 1, but showing a parallel implementation of the multiple simultaneous beamforming system.

FIG. 7 is a block diagram of a parallel implementation of the multiple simultaneous beam forming system 10. As can be seen from the illustration, the arrangement of the array 14 is similar to the serial implementation of FIG. 1. However, in this implementation the multiplexers are eliminated and all n×m sensor outputs are fed directly to the first 1D beamformer 118. The first 1D beamformer 118 parallel transposer 120 and second one-dimensional beamformer 122 are arranged in a manner analogous to the serial implementation, in that they perform the same matrix operations of FIG. 4. However, unlike the serial implementation, the parallel implementation replicates hardware.

Figure 8:
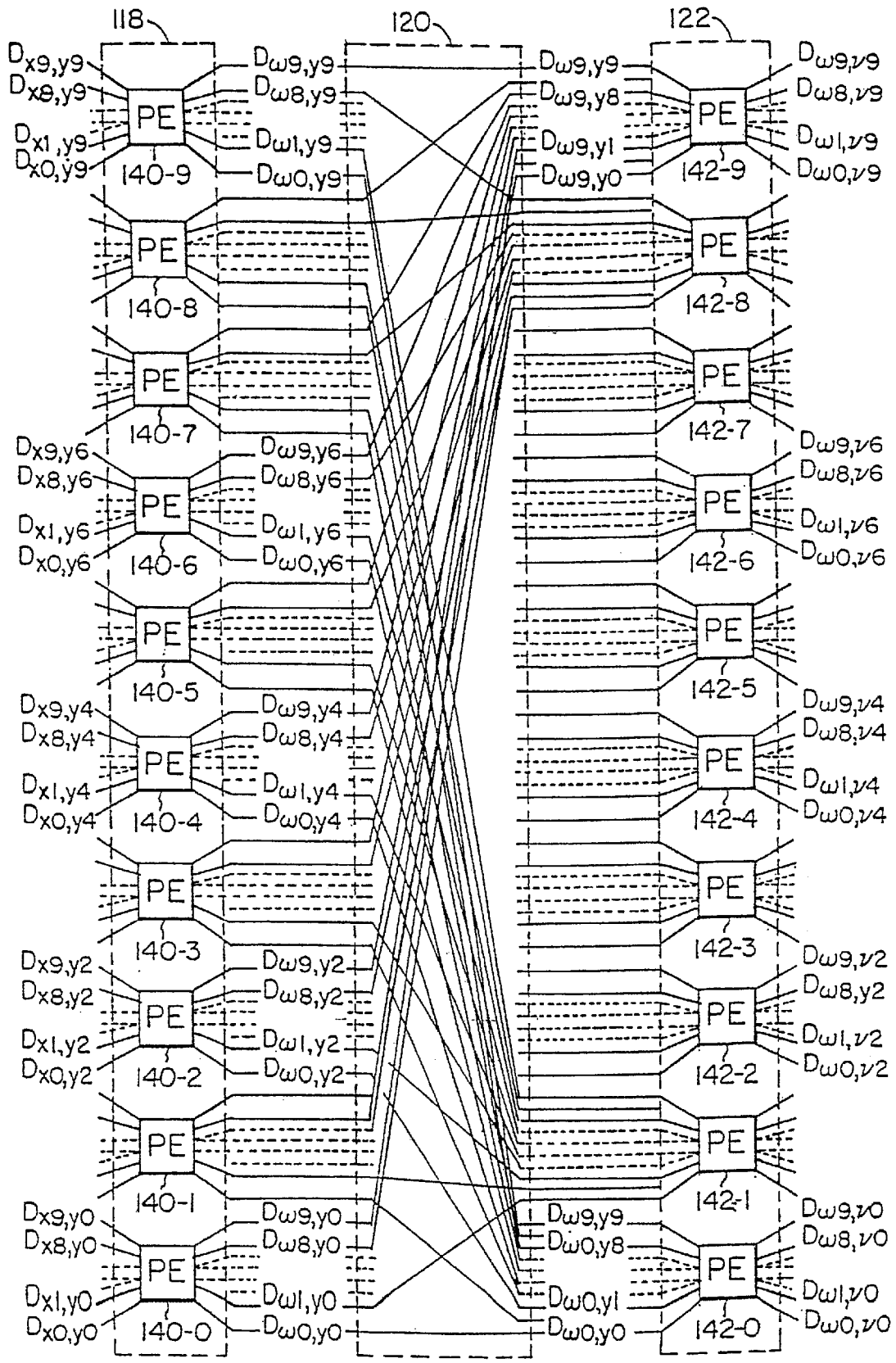
FIG. 8 is a more detailed block diagram showing the interconnection of components for the parallel implementation.

FIG. 8 shows a more detailed view of the parallel implementation for a 10×10 array. The one hundred samples Dx0,y0; Dx1, y0; . . . ; Dx9,y9 from the sensors 12 are fed directly to a bank of ten processing elements 140-0, 140-1, 140-2, 140-3, . . . 140-9. A given processing element 140, such as processing element 140-0, receives samples Dx0,y0; Dx1,y0; . . . , Dx9,y0 from a particular row 15-0 of the array 14; the processing element 140-0 thus provides the ten beamformed samples Dw0,y0; Dw1,y0; . . . ; Dw9,y0 for that row.

The ten processing elements 140 thus operate in parallel to produce 100 outputs at the same time, Dw0,y0; Dw1,y0; . . . ; Dw9,y9 that represent the ten respective beams formed outputs along the x axis.

In this parallel implementation, the transposer 20 is simply the proper routing of the outputs of the first 1D beamformer 18 to the inputs of the second 1D beamformer 22.

The second 1D beamformer 122 is implemented in much the same manner as the first 1D beamformer 118 and includes a bank of ten processing elements 142-0, 142-1 . . . 142-9. The ten processing elements 142 operate in parallel to produce the 100 beamformed outputs Dw0,v0; Dw1,v1; . . . ; Dw9,v9.

Figure 9:
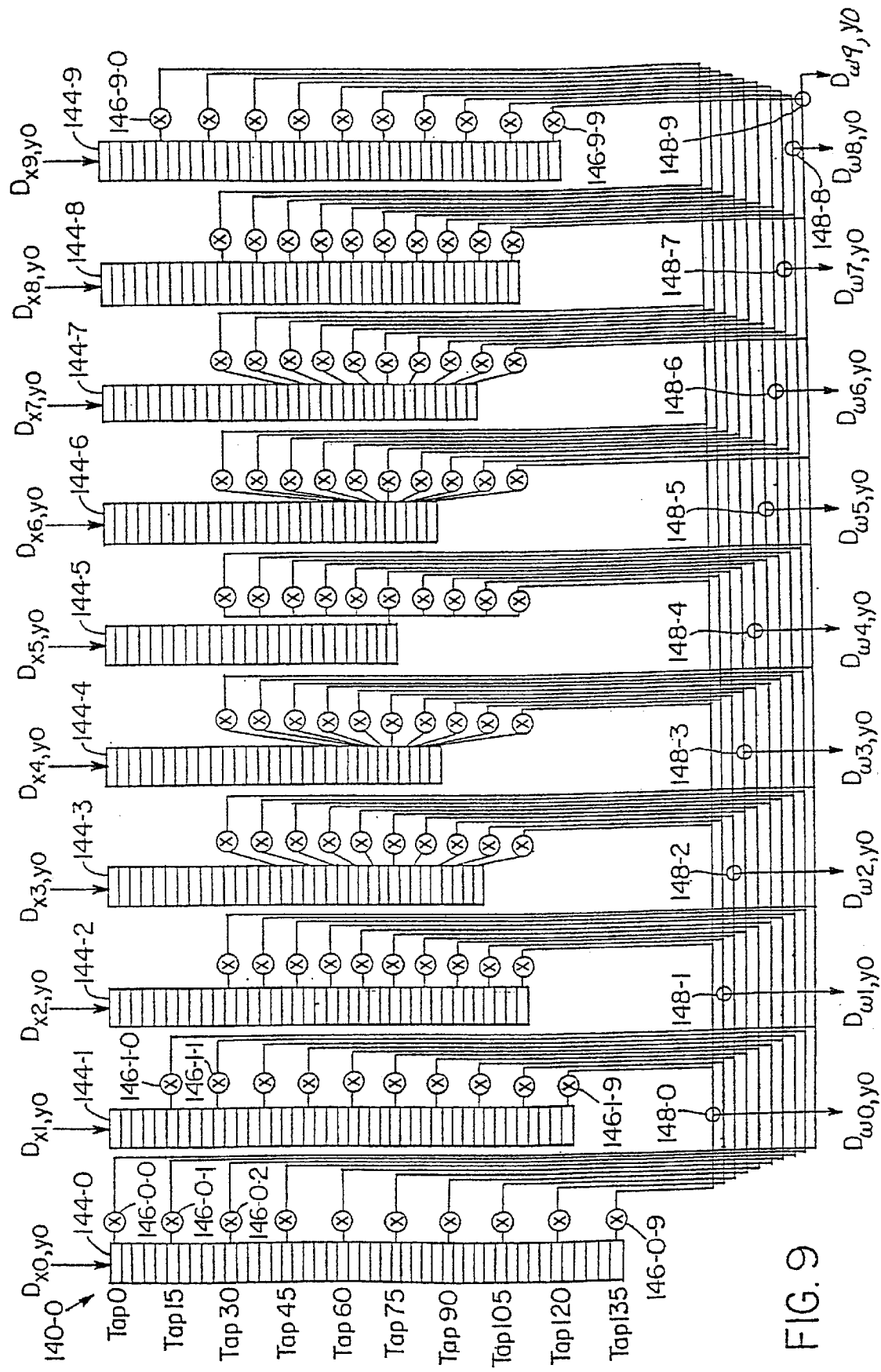
FIG. 9 is a detailed block diagram of a processing element used in the parallel implementation.

An exemplary parallel processing element 140-0 is shown in detail in FIG. 9. Similar to the serial implementation, the parallel processing element 140-0 consists of ten tapped delay lines 144-0, 144-1, . . . , 144-9 operating in parallel that insert delays at the sensor outputs to account for the relative propagation delays of the signals from a particular location. The sensor outputs are multiplied by a weighting factor and then summed. As in the previous embodiment, different weights are applied to different taps of a given delay line 144-0 by a set of multipliers 146-0-0, 146-0-1, . . . , 146-0-9. As for the serial implementation, in order to accomplish multiple beamforming simultaneously, multiple taps are incorporated along each delay line 144. The weighted tap outputs are then summed by a set of adders 148-0, 148-1, . . . , 148-9 to form a particular beam output.

In this parallel implementation the clock rate of the delay lines 144 to accomplish real time processing may be ten times slower. For example, the clock rate need only be the same as the input sampling rate fs. However, the trade-off is that ten of the processing elements 140 are required to produce the necessary beamformed matrix 32.

Processing elements 142 associated with the second 1D beamformer 122 are similar to the exemplary processing element 140-0.

Figure 10:
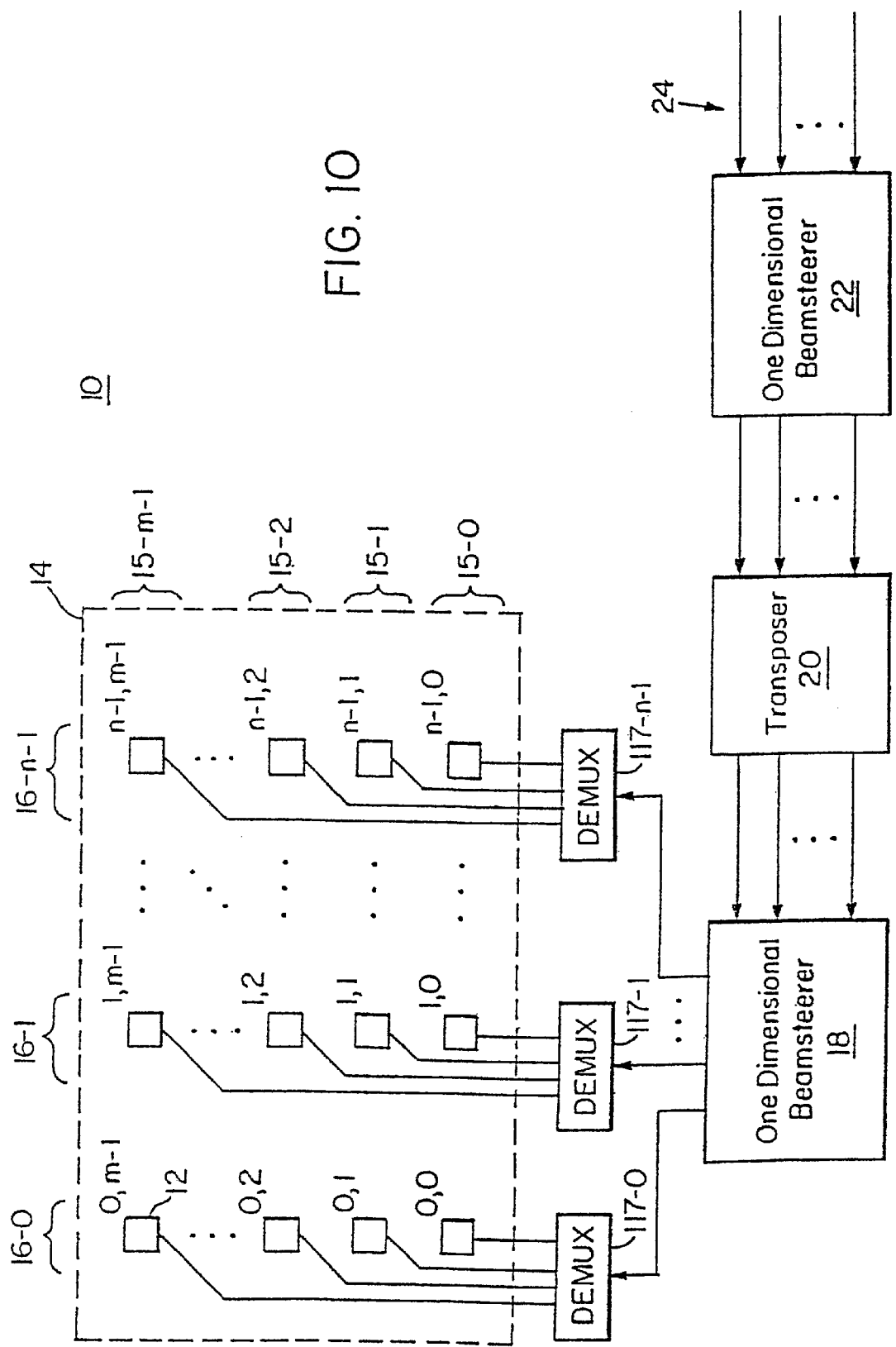
FIG. 10 is a block diagram of a beamsteering system making use of the invention.

FIG. 10 shows a beamsteering implementation of the invention. Here, sensors 12 are transmitting devices, and the sample flow is in the reverse direction. Also, the multiplexers 17 are replaced by demultiplexers 117. Otherwise, the operation of the beamsteering device 10 is analogous to the operation of the beamforming device of FIG. 1.

Figure 11:
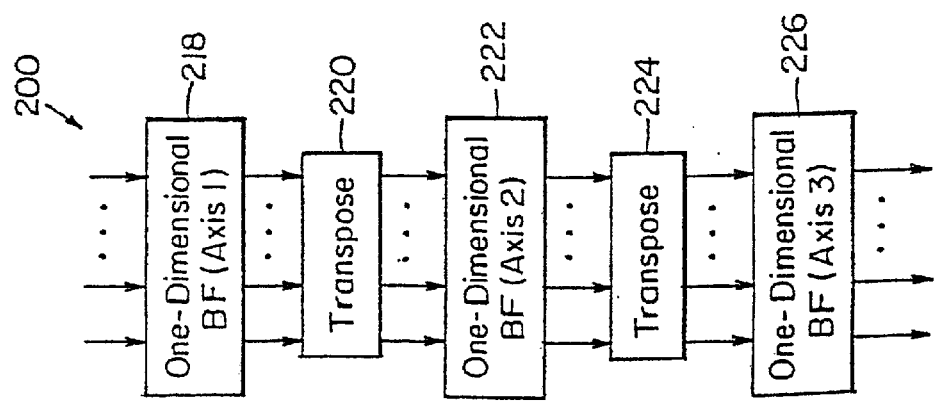
FIG. 11 is a block diagram of a higher dimensional implementation of the multiple simultaneous beamforming system.

Finally with respect to FIG. 11 the invention can be adapted to provide higher dimensional beamforming or beamsteering. For example, a three dimensional beamformer 200 may be implemented from a first 1D beamformer 218, a first transposer 220, and second 1D beamfomer 222 as before, together with a second transposer 224 and third 1D beamformer 226. The third axis for beamforming may be an axis which is provided by a set of sensors arranged as a three-dimensional array.

Another preferred embodiment of the invention relates to a time-domain delay-and-sum beamforming processor that can simultaneously process the returns of a large two dimensional transducer array. The lower-power, highly integrated beamformer is capable of real-time processing of the entire array and enables a compact, affordable unit suitable for many different applications. A delay-and-sum beamformer allows a 2D array to "look" for signals propagating in a particular direction. By adjusting the delays associated with each element of the array, the array's directivity can be electronically steered toward the source of radiation. By systematically varying the beamformer's delays and its shading along a 2D imaging plane, a 2D scan response of the illustrated array can be measured and resulting 2D images representing the 2D radiation sources can be created.

Figure 12:
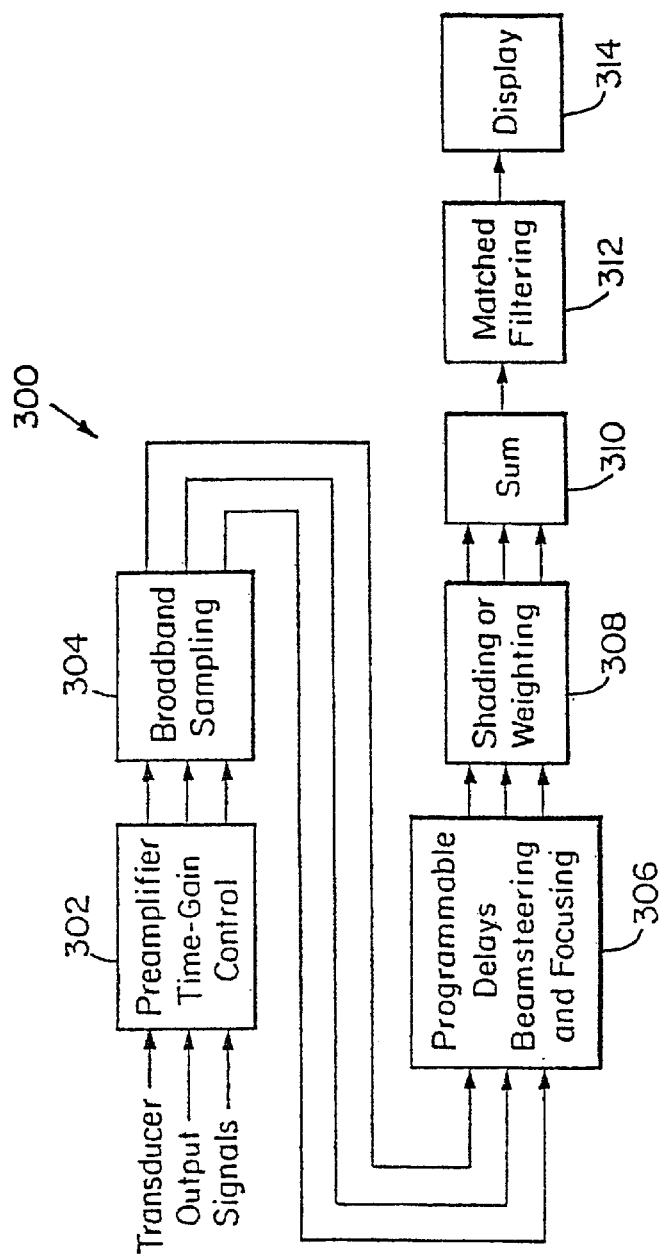
FIG. 12 illustrates a beamforming process utilizing programmable delays, shading and weighting.

A schematic diagram of a time-domain beamforming device for a 3D ultrasound/sonar imaging system 300 is illustrated in FIG. 12. The system can provide continuous real-time large area 2D scanned images throughout a field of view at 30 frames per second or more. The image size is entirely programmable which can be either 128 by 128 or 256 by 256, for example. The delay-and-sum beamforming approach enables target range information to be obtained from the time-of-flight calculations. When a target area is identified by the electronically steerable imaging system, the beamforming electronics can be adjusted to zoom-in to a smaller field-of-view for high-resolution imagery. Furthermore, for a given peak transmit intensity, a matched filter 312 can be applied to the beamformed outputs to provide additional sensitivity.

As shown in FIG. 12, preamplifier time-gain control 302 and broadband sampling 304 are performed on the transducer output signals. Programmable delaying 306, shading 308 and summing 310 are performed to generate the beamformed outputs. After match filtering 312, the resulting 2D image can be displayed 314.

The use of coded or spread spectrum signaling has gained favor in the communications community. It is now routinely used in satellite, cellular, and wire-line digital communications systems. In contrast, the application of this technique to acoustic systems has been prevented primarily due to signal propagation conditions and the relatively slow speed of sound in water (1500 m/s) or air when compared with electromagnetic propagation.

Despite these difficulties, the benefits of using coded signals in underwater acoustic systems, for example, offers the potential for high-resolution imaging while significantly lowering the probability of external detection. These signals also provide signal processing gain that improves the overall system detection sensitivity.

Direct sequence modulation is the modulation of a carrier signal by a code sequence. In practice, this signal can be AM (pulse), FM, amplitude, phase or angle modulation. It can also be a pseudorandom or PN sequence comprised of a sequence of binary values that repeat after a specified period of time.

The processing gain realized by using a direct sequence system is a function of the signal transmitted compared with the bit rate of the information. The computed gain is the improvement resulting from the RF to information bandwidth tradeoff. Using direct-sequence modulation, the process gain is equal to the ratio of the RF-spread spectrum signal bandwidth divided by the information rate in the baseband channel, $G_p = BW_{RF}/R$, where R is typically expressed in bits/Hz for digital communications.

The objective of a beamforming system is to focus signals received from an image point onto a transducer array. By inserting proper delays in a beamformer to wavefronts that are propagating in a particular direction, signals arriving from the direction of interest are added coherently, while those from other directions do not add coherently or cancel. For a multi-beam system, separate electronic circuitry is necessary for each beam.

Using conventional implementations, the resulting electronics rapidly become both bulky and costly as the number of beams increases. Traditionally, the cost, size, complexity and power requirements of a high-resolution beamformer have been avoided by "work-around" system approaches which form a number of transducer elements typically used in the sonar array. A typical configuration uses a center beam together with four adjacent beams aimed left, right, above and below the center. The beams are each formed from fifty or more elements in an array each phased appropriately for the coherent summation in the five directions of interest. The advantage of using so many elements is narrower beamwidths when compared with a smaller array, however, knowledge of the outside world is still based on a five pixel image. For real-time 3D high-resolution sonar imaging applications, a preferred embodiment utilizes an electronically steerable two-dimensional beamforming processor based on a delay-and-sum computing algorithm.

A delay-and-sum beamformer allows a 2D array to "look" for signals propagating in particular directions. By adjusting the delays associated with each element of the array, the array's "look" direction or field of view can be electronically steered toward the source of radiation. By systematically varying the beamformer's delays and its shading or apodization along a 2D imaging plane, a 2D scan response of the array can be measured and resulting images representing the 2D radiation sources can be generated. To realize such a delay-and-sum beamformer, a programmable delay line is needed at each receiver. However, as the array is scanning through the imaging plane, there are two difficult implementation issues: first, each delay line has to be long enough to compensate for the path differences of a large area array, and second, the delay value has to be adjusted at each clock cycle for proper beam steer(i.e., the time-of-flight from the radiation source to the focal point has to be calculated at every clock cycle). For example, for a 10 m range requirement with a resolution of one to two centimeters dictates an array aperture in the range of 40 cm. To realize a thirty degree scanning volume, the maximum delay is of 70 $\mu$s. This implies that a 2,300-stage delay line and a 12-bit control word are needed at each receiver to achieve the time-of-flight delay requirements. The long delay and large number of digital I/Os would set an upper limit on how many processors can be integrated on one chip. For example, for a 64-channel time domain beamforming electronics, a straightforward implementation would require 64 2,300-stage delay lines and 768 digital I/O pads. Such a large area chip and large number of I/O connections would make the implementation impractical.

An electronic beamforming structure is described to circumvent the impractically long delay line requirement and a delay-update computation based on the determination of time-of-flight surface coordinates is presented to reduce the digital I/O requirement. This electronic programmable beamforming structure functions as an electronically adjustable/controllable virtual acoustic lens. For this reason, this device is referred to herein as an electronically-controlled conformal lens.

Figure 13:
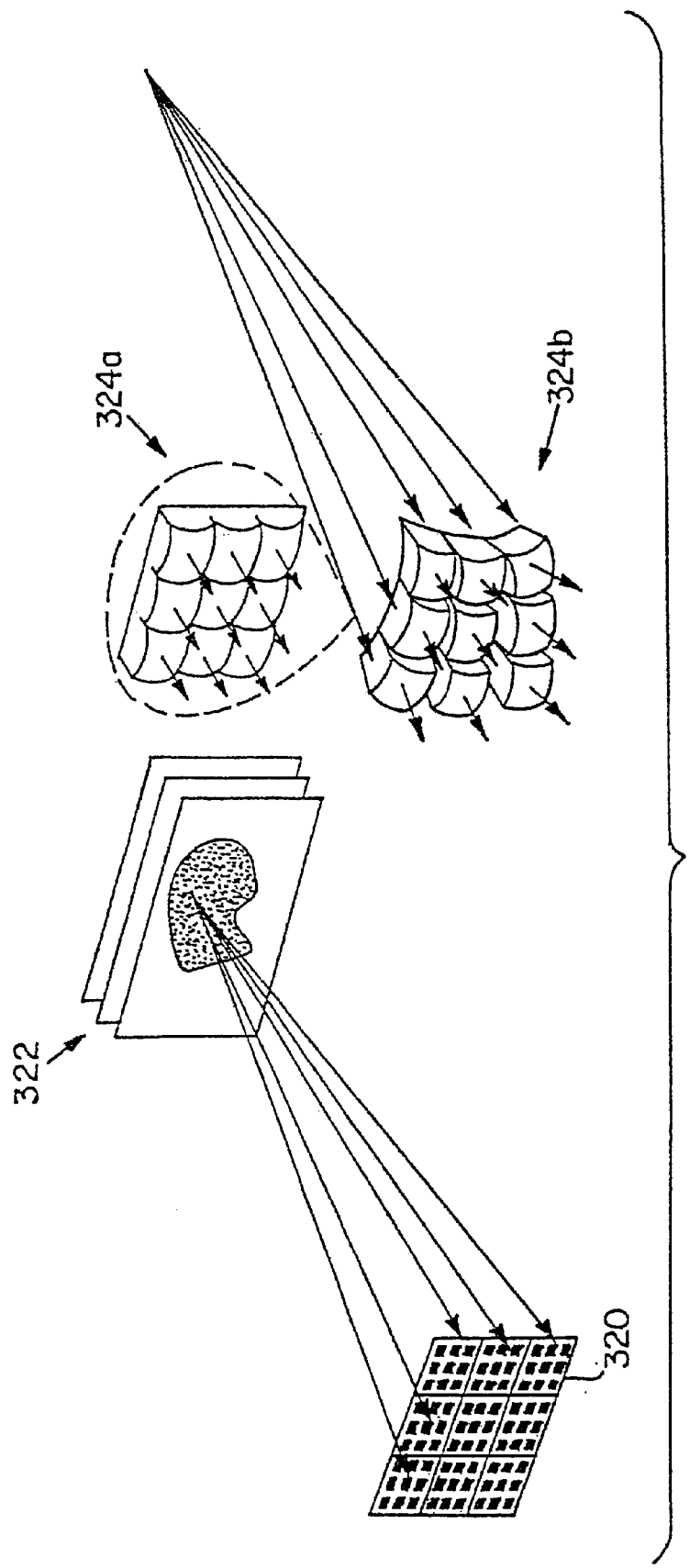
FIG. 13 illustrates an array of subarrays for an electronically adjustable acoustic conformal lens in accordance with the invention.

An electronically-adjustable acoustic conformal lens uses a divided surface of a 2D transducer array in which plane "tiles" of relatively small subarrays are provided. As depicted in the embodiment of FIG. 13, the tiles/subarrays 320 are made small enough so that when an object is placed within the field-of-view of the imaging system, the incident radiation 322 from the object toward each "tile" can be treated using a far-field approximation. Additional delay elements are incorporated within each subarray to allow all subarrays to be coherently summed (i.e., global near-field beamforming can be achieved by delaying and then summing the outputs from all subarrays). The delay-and-sum beamformer allows each subarray 324 to "look" for signals radiating from a particular direction as illustrated by the differences between configuration 324a and configuration 324b. By adjusting the delays associated with each element of the array, the array's viewing angle direction can be electronically steered toward the source of radiation. The delay line requirement for each element in the sub-array can be as short as several hundred stages. Only a single long delay for global summing is needed on each subarray processor.

Figure 14A:
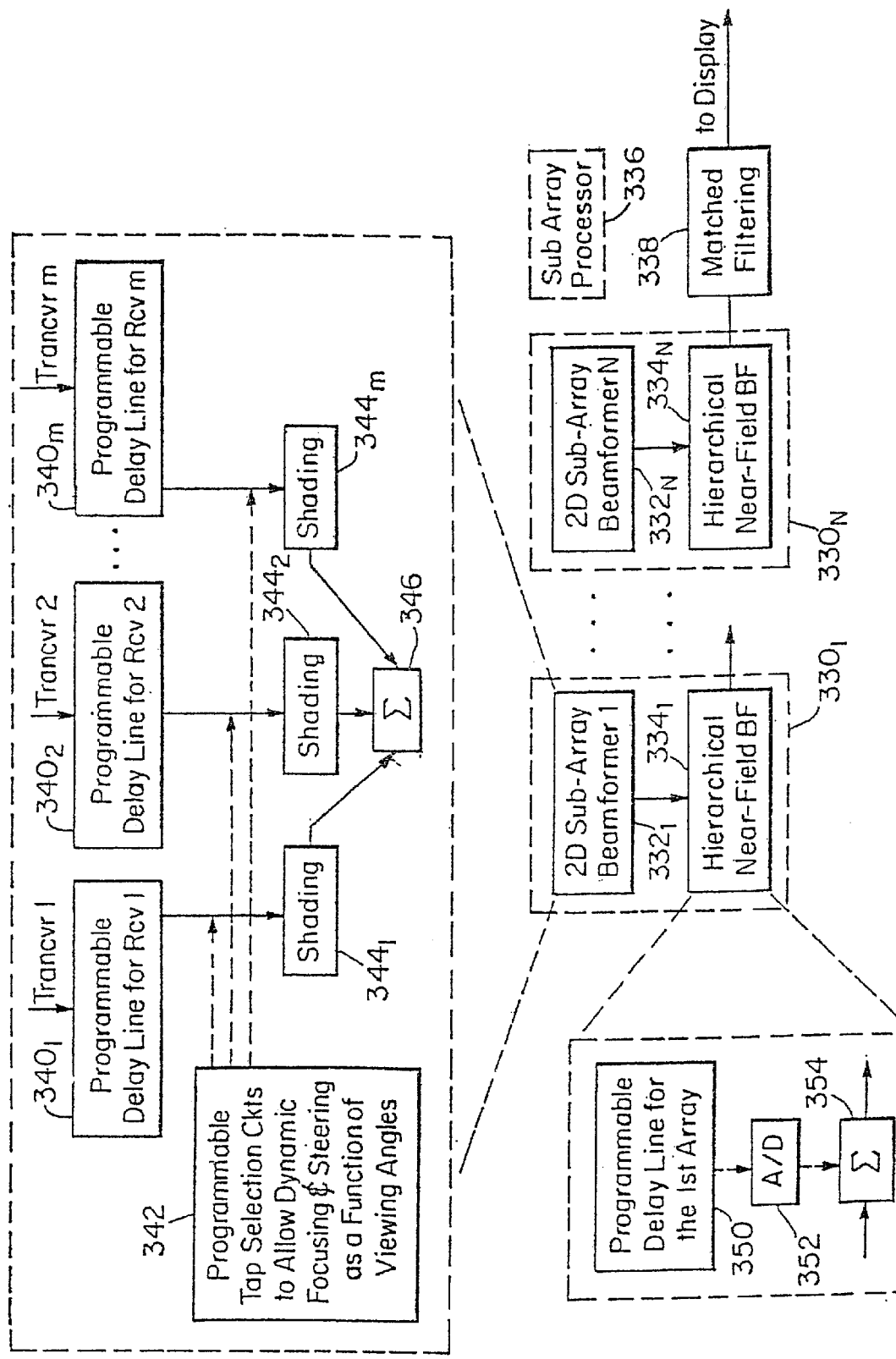
FIG. 14A illustrates an electronically controlled beamforming system in accordance with the invention.

A detailed diagram of an electronically-controlled beamforming system in accordance with the invention is shown in FIG. 14A. This system consists of a bank of parallel sub-array processors $330_1$ to $330_N$. Each processor is a single integrated silicon circuit that comprises two components: a 2D sub-array beam former 332 for far-field beamsteering/focusing and an additional delay line 334 to allow hierarchical near-field beamforming of outputs from each subarray. As previously mentioned, the delays associated with each receiver element have to be adjusted to allow the subarray to "look" for signals arriving from a particular direction. As can be seen in FIG. 14A, for an m-element sub-array, m-parallel programmable tapped delay lines $340_1$ to $340_m$ are used for delay adjustment. Within each delay line, a time-of-flight computation circuit 342 is used to select the tap position output from a charge-domain circuit that non-destructively senses the tapped-delay line output. Inaccuracy of this charge sensing mechanism is only limited by the charge transfer inefficiency which is less than $10^{-6}$. As a result, the delay can be dynamically adjusted at every clock cycle where the delay resolution is determined by the clock rate. Except for the clock skew, which can be controlled to less than 1 ns, there are no other spurious or dispersive effects. Each receiver has a multiplier 344 for beam shading/apodization. Within each processor, all the multipliers share a common output 346. The summed charge is then applied to a second tapped delay line 350, which allows the delay from each subarray be adjusted so that all the subarrays can look at the same source of radiation. A charge-domain A/D converter 352 is used so that hierarchical summing 354 can be output digitally.

Figure 14B:
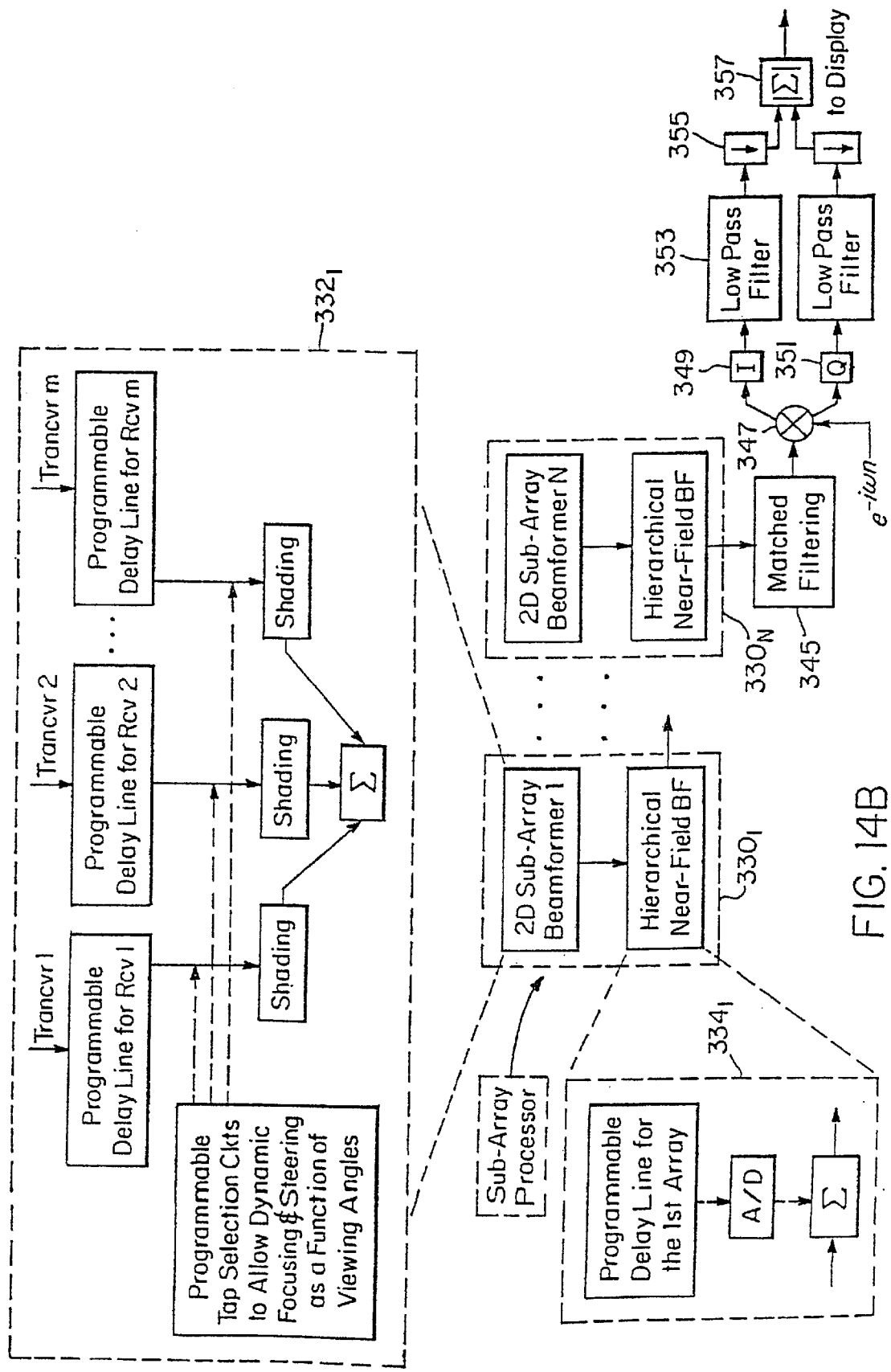
FIGS. 14B and 14C illustrate additional preferred embodiments of a beamforming system in accordance with the invention.
Figure 14C:
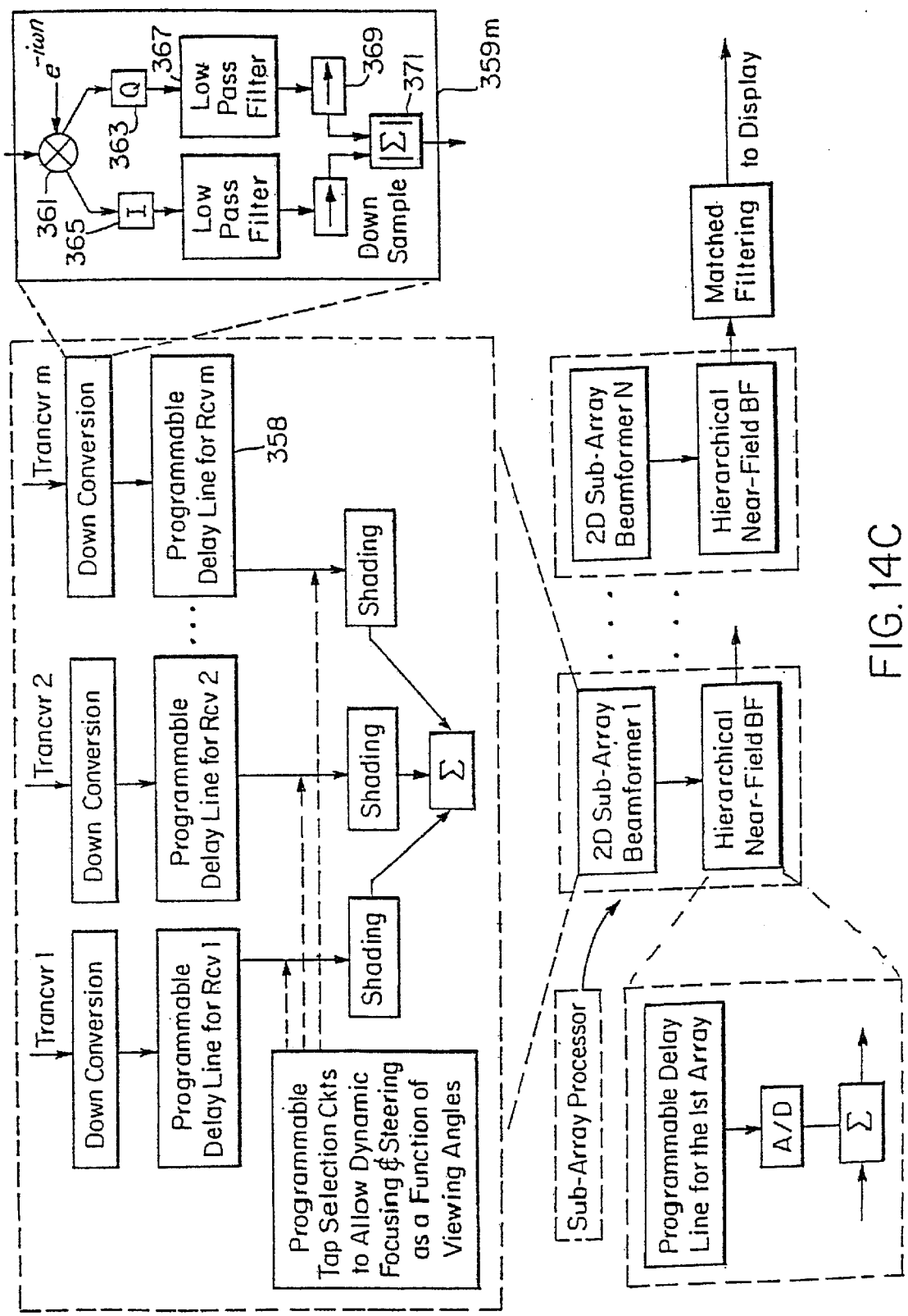

Shown in FIGS. 14B and 14C are systems for 2D sonar beamformer with downconversion. The first embodiment shown in FIG. 14B depicts the downconversion following the matched filter 345. A complex-valued multiply 347 is performed, followed by low-pass filtering 353 and sample-rate down-conversion 355. The absolute magnitude is then taken to retrieve the envelope of the signal. The A/D conversion can follow the complex-valued multiplication, however, this embodiment uses an A/D in each Hierarchial Nearfield BF block.

The down converter of FIG. 14C is shown as the first operation 357 in each channel of a submodule. Although this can be a preferred method to reduce the signal-bandwidth/ data rates through the remainder of the system, it is a more hardware intensive system. The multiplier 361 generates in phase (I) and quadrature (Q) components 363, 365 that are low pass filtered 367, converted 369 and summed 371 prior to delay 358.

Figure 15:
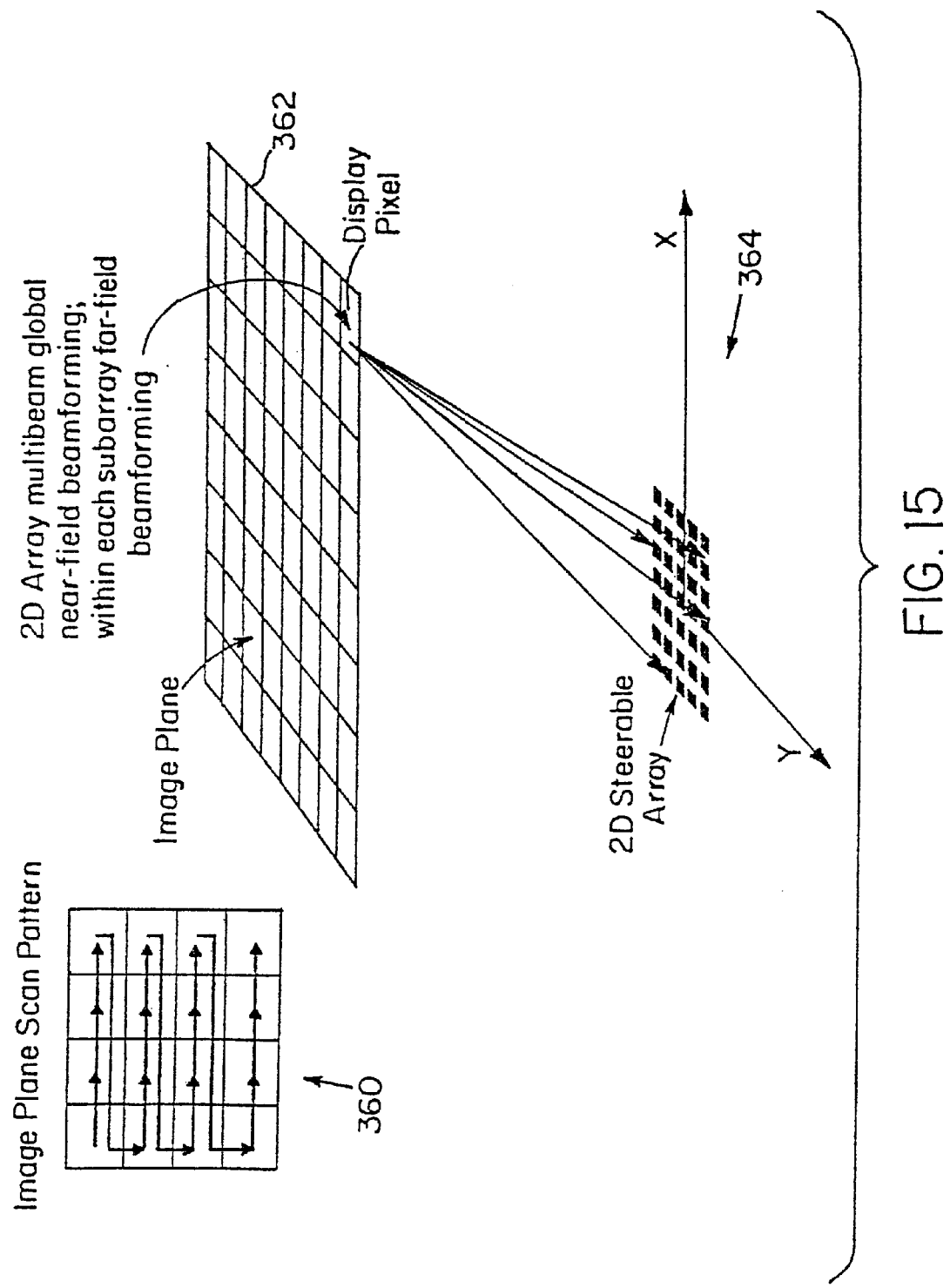
FIG. 15 illustrates a method of adjusting delays and shading in a scan pattern in accordance with the invention.

By systematically varying the beamformer's delays and its shading along a 2D imaging plane, a rectilinear 2D scan pattern 360 of the array can be measured and resulting 2D images representing the 2D radiation sources can be created, see FIG. 15. The system can provide continuous real-time large area scanned images throughout a large field of view at 30 frames/s or more. The delay-and-sum beamforming system provides target range information to be obtained from the time-of-flight calculations. When a target area is identified by the electronically steerable sonar system, the beamforming electronics 364 can be adjusted to zoom-in to a smaller field-of-view for high-resolution imagery. Furthermore, for a given peak transmit intensity, a matched filter can be applied to the beamformed outputs to provide additional sensitivity. A low-power, finite-impulse-response (FIR) filter can be used to implement the matched filter at the output of the beamforming process to improve the system signal to noise ratio.

In real-time imaging applications, focus-and-steer images require knowledge of the time of flight from each source to each receiver in an array. To compute a new point on any time-of-flight surface requires finding the square root of the sum of squares, which is a computationally intensive task. A delay-update computation method can be used which reduces the determination of the rectangular coordinates of a new point on any time-of-flight surface to the computation time of a single addition. It is well-known that the method of moments can be used to synthesize basis functions that represent an arbitrary multidimensional function. Although the complete basis requires the determination of infinitely many coefficients, a finite-degree basis function can be generated using a least-mean-square (LMS) approximation. The specific form of the finite-degree basis depends on functional separability and limits of the region of support. Using the forward-difference representation of the truncated moments basis, a new functional value can be computed at every clock cycle. If the computation is performed within a square region of support, the direction of the finite difference corresponds to the direction that the function is computed. For example, functional synthesis from the upper-right to lower-left corners within the region of support implies the computation of a multidimensional, backward difference representation. Conversely the multi-dimensional, forward-difference representation, presented above, allows functional synthesis to proceed from the lower-left to the upper-left corners within the region of support. This approach produces images at least an order of magnitude faster than conventional time-of-flight computation.

In practice, the complete moments basis representation of a surface can be degree-limited for synthesis. One truncation method is to approximate f(x,y) with a bivariate polynomial of degree M. The bi-$M^{th}$ degree approximation can be written as $$\hat{f}(x, y) = \sum_{p=0}^{M} \sum_{q=0}^{M} \hat{a}_{p,q} x^p y^q$$

where â can be derived based on the LMS criterion, $$\frac{\partial}{\partial a_{p,q}} \int_{x_1}^{x_2} \int_{y_1}^{y_2} [f(x, y) - \hat{f}(x, y)]^2 dx dy = 0.$$

Once the coefficients $\hat{a}_{p,q}$ of the bi-Mth degree polynomial $\hat{f}(x,y)$ possess positive-integer powers of x and y, it can be formulated as a stable, forward-difference equation. In general, $(M+1)^2$ forward-difference terms are sufficient to describe a polynomial whose highest degree in x and y is M. The terms completely specify $\hat{f}(x,y)$ within its region of support.

Based on the assumption that the surface is to be scanned in a raster fashion and has been scaled, the step size is 1. For this case, the first and second forward differences in one dimension are $$\Delta_x^1 = \hat{f}(x_0+1, y_0) - \hat{f}(x_0, y_0),$$

$$\Delta_x^2 = \hat{f}(x_0+2, y_0) - 2\hat{f}(x_0+1, y_0) + \hat{f}(x_0, y_0)$$

Using these forward differences, a second-degree polynomial in one dimension can be written in difference form as $$\hat{f}(x_0 + k, y_0) = \hat{f}(x_0 + y_0) + \begin{bmatrix} k-1 \\ k \end{bmatrix} \Delta_x^1 = \begin{bmatrix} k-2 \\ k \end{bmatrix} \Delta_x^2$$

where $$\begin{bmatrix} k \\ n \end{bmatrix} = \frac{k!}{n!(n-k)!}.$$

It follows that the two-dimensional forward differences can be obtained by evaluating the cross product term in $\hat{f}(x,y)$, $$\Delta_x^n \Delta_y^l = \sum_{p=0}^{n} \sum_{q=0}^{n} (-1)^{n+l-p-q} \begin{bmatrix} p \\ n \end{bmatrix} \begin{bmatrix} q \\ l \end{bmatrix} \hat{f}(x_0 + p, y_0 + q)$$

A CMOS computing structure can be used to perform functional synthesis using the forward-difference representation of a multidimensional, finite-degree polynomial. This implementation allows the synthesis of arbitrary functions using repeated additions with no multiplications. An example of this computing structure 370 is presented in FIG. 16 for a two dimensional, first-degree, forward difference realization. As shown in FIG. 16 each register 372, represented by a rectangular box, contains the appropriate forward-difference term. Switches, which are located between registers, determine whether the x or y direction is synthesized. The advantage of this structure is that it allows additions to occur simultaneously at each of the adders 376. Thus only one addition time is required to produce the next function value. For a multi-channel processor, each channel contains its own functional update circuitry. As the beam is steered through a given imaging plane, the delay requirements for each channel are computed in parallel and can be updated within one clock period. For a 64 channel beamforming processors, at a 40 MHz clock rate, a continuous delay update rate of 30 billion bits/s can be achieved based on this approach.

Using this approach, instead of the alternative 11 bits/channel, the digital connectivity can be reduced to 1 bit/channel followed by on-chip computation circuitry to generate the equivalent 12 bit value while maintaining the 30 billion bits/s parallel update rate.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein but intend to cover all such changes and modifications as are obvious to one of ordinary skill in the art.

We claim:

1. A multidimensional beamforming device, comprising:
    a multidimensional sensor array that provides array signals, the sensor array including a first plurality of sensor elements extending in a first direction and a second plurality of sensors extending in a second direction;
    a first beamforming tapped delay line device, coupled to the multidimensional sensor array, that generates delayed output signals based on the array signals; and
    a second beamforming tapped delay line device, that receives the delayed output signals from, the first tapped delay line device, the second tapped delay line device generating a multidimensional representation of a region of interest based on the delayed output signals.

2. The multidimensional beamforming device of claim 1 further comprising:
    a transpose device, coupled between the first and second tapped delay line devices, for transposing the delayed output signals generated by the first tapped delay line device such that the second tapped delay line device generates the multidimensional representation of the region of interest based on the transposed delayed output signals.

3. The multidimensional beamforming device of claim 2 wherein the first tapped delay line device forms at least a portion of a first one-dimensional beamformer, and wherein the second tapped delay line device forms at least a portion of a second one-dimensional beamformer.

4. The multidimensional beamforming device of claim 3 wherein the first one-dimensional beamformer forms beams along a first set of angles formed with respect to a first plane, and wherein the second one-dimensional beamformer forms beams along a second set of angles formed with respect to a second plane that is non-planar with the first plane.

5. The multidimensional beamforming device of claim 1 wherein the multidimensional sensor array includes subarrays of sensor elements.

6. The multidimensional beamforming device of claim 5 wherein the first tapped delay line device has a plurality of tap positions, each tap position being programmable, and includes groups of first delay lines corresponding to the subarrays of the multidimensional sensor array, each first delay line of a group being coupled to a sensor element of that group's corresponding subarray.

7. The multidimensional beamforming device of claim 6 wherein the second tapped delay line device has a plurality of tap positions, each tap position being programmable, and includes second delay lines, each second delay line being coupled to one of the groups of first delay lines.

8. The multidimensional beamforming device of claim 1 wherein the first tapped delay line device has a plurality of tap positions, each tap position being programmable and, operates such that at least a portion of the delayed output signals form a multidimensional representation having a first resolution, the multidimensional representation generated by the second programmable tapped delay line device having a second resolution that is lower than the first resolution.

9. The multidimensional beamforming device of claim 1 wherein the first tapped delay line device has a plurality of tap positions, each tap position being programmable and, is arranged to perform a far-field approximation, and wherein the second programmable tapped delay line device is arranged to perform a near-field approximation.

10. A method for beamforming comprising steps of:
    obtaining array signals from a multidimensional sensor array which includes a first plurality of sensor elements extending in a first direction and a second plurality of sensors extending in a second direction;
    programming a first programmable tapped delay line device to generate delayed output signals based on the array signals; and
    programming a second programmable tapped delay line device that receives the delayed output signals, to generate a multidimensional representation of a region of interest based on the delayed output signals.

11. The method of claim 10 further comprising a step of: transposing the delayed output signals generated by the first programmable tapped delay line device such that the second programmable tapped delay line device generates the multidimensional representation of the region of interest based on the transposed delayed output signals.

12. The method of claim 11 wherein the step of programming the first programmable tapped delay line device includes forming beams along a first set of angles formed with respect to a first plane, and wherein the step of programming the second programmable tapped delay line device includes forming beams along a second set of angles formed with respect to a second plane that is non-planar with the first plane.

13. The method of claim 10 wherein the step of programming the first programmable tapped delay line device includes forming a multidimensional representation having a first resolution, the multidimensional representation generated by the second programmable tapped delay line having a second resolution that is lower than the first resolution.

14. The method of claim 10 wherein the step of programming the first programmable tapped delay line device includes performing a far-field approximation, and wherein the step of programming the second programmable tapped delay line device includes performing a near-field approximation.

15. A multidimensional beamforming device comprising:
    a multidimensional sensor array including a first plurality of sensor elements extending in a first direction and a second plurality of sensors extending in a second direction;
    a first programmable tapped delay line device that receives signals from the sensor array and that generates delayed output signals; and
    a second programmable tapped delay line device that is electrically connected to the first programmable tapped delay line device and that receives the delayed output signals, the second programmable tapped delay line device generating a multidimensional representation of a region of interest.

16. The device of claim 15 wherein the sensor array comprises a plurality of independently controllable subarrays.

17. The device of claim 15 wherein each delay line device comprises a charge coupled device.

18. The device of claim 15 further comprising a down conversion circuit.

19. The device of claim 15 further comprising a scan controller to scan the array across an image plane.

20. The device of claim 16 further comprising a plurality of delay lines for each subarray, and output of each delay line being summed an input into the second programmable delay line.

21. The device of claim 15 wherein the first tapped delay line device comprises an integrated circuit.

22. The device of claim 15 wherein the second delay line device comprises an integrated circuit.

23. The device of claim 15 wherein the first delay line device comprises a plurality of beamforming delay lines connected to a summing circuit, the summing circuit being connected to an input for the second tapped delay line device.

24. The device of claim 15 further comprising a sampling circuit connected to the sensor array and the first delay line device.

25. The device of claim 15 further comprising a down-conversing circuit and a low pass filter.

* * * * *